(12) United States Patent
Taylor et al.

(10) Patent No.: US 11,794,369 B2
(45) Date of Patent: Oct. 24, 2023

(54) APPARATUS AND METHOD FOR AUTOMATICALLY APPLYING WEIGHT MATERIAL TO A WHEEL

(71) Applicant: 3M INNOVATIVE PROPERTIES COMPANY, St. Paul, MN (US)

(72) Inventors: John S. Taylor, Commerce, MI (US); Benjamin D. Belknap, Northville, MI (US); Mark A. Compton, Lake Orion, MI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 253 days.

(21) Appl. No.: 17/154,315

(22) Filed: Jan. 21, 2021

(65) Prior Publication Data

US 2021/0138674 A1 May 13, 2021

Related U.S. Application Data

(63) Continuation of application No. 15/765,500, filed as application No. PCT/US2016/055485 on Oct. 5, 2016, now Pat. No. 10,933,549.

(Continued)

(51) Int. Cl.
*B26D 1/08* (2006.01)
*B26D 7/30* (2006.01)
(Continued)

(52) U.S. Cl.
CPC .............. *B26D 1/08* (2013.01); *B26D 7/30* (2013.01); *B65H 35/0006* (2013.01);
(Continued)

(58) Field of Classification Search
CPC ........ G01M 1/02; G01M 1/045; G01M 1/326; B65H 35/0006; B65H 35/0013; B65H 2801/93; B26D 1/08; B26D 7/30
See application file for complete search history.

(56) References Cited

U.S. PATENT DOCUMENTS 1,751,562 A 3/1930 Stinger
3,177,039 A 4/1965 Skidmore
(Continued)

FOREIGN PATENT DOCUMENTS

CN 102081004 6/2011
CN 204221840 3/2015
(Continued)

OTHER PUBLICATIONS

International Search Report for PCT International Application No. PCT/US2016/055485, dated Feb. 17, 2017, 7pgs.
(Continued)

*Primary Examiner* — Natalie Huls
(74) *Attorney, Agent, or Firm* — Carlos M. Téllez Rodríguez; 3M Innovative Properties Company

(57) ABSTRACT

An apparatus for applying weight material onto a wheel may include a conveyor assembly, upper and lower severing-head assemblies, and upper and lower control arms. The severing-head assemblies may be mounted above and below the conveyor assembly and may include a housing, a severing device and a dispensing mechanism. The dispensing mechanism may position the weight material from a source relative to the severing device. The severing device may separate a predetermined amount of weight material from a source. The control arms may be movably mounted above and below the conveyor assembly and have weight-application tools configured to transfer the predetermined amounts of weight material from the severing-head assemblies to locations on the wheel.

18 Claims, 18 Drawing Sheets

Related U.S. Application Data

(60) Provisional application No. 62/237,357, filed on Oct. 5, 2015.

(51) Int. Cl.
| | | |
|---|---|---|
| *G01M 1/32* | (2006.01) | |
| *G01M 1/02* | (2006.01) | |
| *B65H 35/00* | (2006.01) | |
| *G01M 1/04* | (2006.01) | |
| *G07F 11/08* | (2006.01) | |
| *G07F 17/00* | (2006.01) | |

(52) U.S. Cl.
CPC .......... *B65H 35/0013* (2013.01); *G01M 1/02* (2013.01); *G01M 1/045* (2013.01); *G01M 1/326* (2013.01); *G07F 11/08* (2013.01); *G07F 17/00* (2013.01); *B65H 2801/93* (2013.01)

(56) References Cited

U.S. PATENT DOCUMENTS

| | | | |
|---|---|---|---|
| 3,273,941 A | 9/1966 | Skidmore | |
| 3,732,761 A | 5/1973 | Sanders | |
| 3,779,119 A | 12/1973 | Broides | |
| 3,800,894 A | 4/1974 | Keser | |
| 3,960,409 A | 6/1976 | Songer | |
| 4,003,525 A | 1/1977 | Podvin | |
| 4,335,439 A | 6/1982 | St. Denis | |
| 4,689,457 A | 8/1987 | Izumiya | |
| 5,279,195 A | 1/1994 | Breton | |
| 5,363,728 A | 11/1994 | Elsner | |
| 5,956,205 A | 9/1999 | Konno | |
| 5,959,205 A | 9/1999 | Yamaya | |
| 6,082,191 A | 7/2000 | Neiferd | |
| 6,119,814 A | 9/2000 | Kane | |
| 6,125,904 A | 10/2000 | Kane | |
| 6,176,288 B1 | 1/2001 | Kane | |
| 6,209,684 B1 | 4/2001 | Kane | |
| 6,234,232 B1 | 5/2001 | Kane | |
| 6,286,906 B1 | 9/2001 | Nagashima | |
| 6,364,421 B1 | 4/2002 | Pursley | |
| 6,364,422 B1 | 4/2002 | Sakaki | |
| 6,413,626 B1 | 7/2002 | Wollner | |
| 6,481,083 B1 | 11/2002 | Lawson | |
| 6,502,618 B1 | 1/2003 | Kane | |
| 6,539,852 B2 | 4/2003 | Ertl | |
| 6,581,444 B2 | 6/2003 | Bal | |
| 6,616,089 B2 | 9/2003 | Gross | |
| 6,877,544 B2 | 4/2005 | Kane | |
| 6,886,231 B2 | 5/2005 | Lawson | |
| RE39,312 E | 10/2006 | Kane | |
| 7,185,410 B2 | 3/2007 | Lawson | |
| 7,434,454 B2 | 10/2008 | Matsumoto | |
| 7,478,659 B2 | 1/2009 | Jeon | |
| 7,600,306 B2 | 10/2009 | Lawson | |
| 8,161,650 B2 | 4/2012 | Lawson | |
| 8,182,639 B2 | 5/2012 | Donnay | |
| 8,336,379 B2 | 12/2012 | Rogalla | |
| 8,505,423 B2 | 8/2013 | Hedtke | |
| 8,561,464 B2 | 10/2013 | Peinelt | |
| 8,925,964 B1 | 1/2015 | Duppong | |
| 8,943,940 B2 | 2/2015 | Hedtke, Jr. | |
| 2002/0152811 A1 | 10/2002 | Gross | |
| 2006/0016309 A1 | 1/2006 | Spaulding | |
| 2006/0169415 A1 | 8/2006 | Lawson | |
| 2007/0074824 A1 | 4/2007 | Lawson | |
| 2008/0156447 A1 | 7/2008 | Lawson | |
| 2009/0001803 A1 | 1/2009 | Taylor | |
| 2009/0084506 A1 | 4/2009 | Lawson | |
| 2010/0051206 A1 | 3/2010 | Lawson | |
| 2010/0058859 A1 | 3/2010 | Rogalla | |
| 2010/0059154 A1 | 3/2010 | Perecman | |
| 2010/0147458 A1 | 6/2010 | Donnay | |
| 2010/0154611 A1 | 6/2010 | Lammlein | |
| 2010/0163189 A1 | 7/2010 | Lawson | |
| 2010/0175522 A1 | 7/2010 | Hedtke, Jr. | |
| 2011/0226055 A1 | 9/2011 | Rogalla | |
| 2011/0283790 A1 | 11/2011 | Hedtke, Jr. | |
| 2012/0073764 A1 | 3/2012 | Lawson | |
| 2012/0125542 A1 | 5/2012 | Lawson | |
| 2015/0008278 A1 | 1/2015 | Bode | |
| 2015/0010380 A1 | 1/2015 | Bürgel | |
| 2015/0027225 A1 | 1/2015 | Rogalla | |
| 2015/0090032 A1 | 4/2015 | Hedtke, Jr. | |
| 2016/0290885 A1 | 10/2016 | Straitiff | |
| 2016/0319904 A1 | 11/2016 | Hornung | |
| 2016/0320260 A1 | 11/2016 | Lim | |
| 2017/0173931 A1 | 6/2017 | Burgel | |
| 2017/0247221 A1 | 8/2017 | Chevrier | |
| 2019/0249750 A1 | 8/2019 | Burgel | |
| 2019/0329436 A1 | 10/2019 | Kerwin | |

FOREIGN PATENT DOCUMENTS

| | | | |
|---|---|---|---|
| DE | 19922085 | | 12/2000 |
| DE | 19961828 | | 6/2001 |
| EP | 1253414 | | 10/2002 |
| JP | 7108801 | | 4/1995 |
| JP | H10142094 | | 5/1998 |
| JP | 2007064275 | | 3/2007 |
| KR | 20160129465 A | * | 11/2016 |
| WO | WO 2007-081843 | | 7/2007 |
| WO | WO 2015-134426 | | 9/2015 |

OTHER PUBLICATIONS

3M Wheel Weight System, TN-2015 and TN-2023, Technical Data Sheet, May 2007, 2 pages.
3M Mechanical Replacement Weight, TN4014 (PN99427), Technical Data Sheet, Oct. 2008, 2 pages.
3M Engineering Drawings, 2007, 48 pages.

* cited by examiner

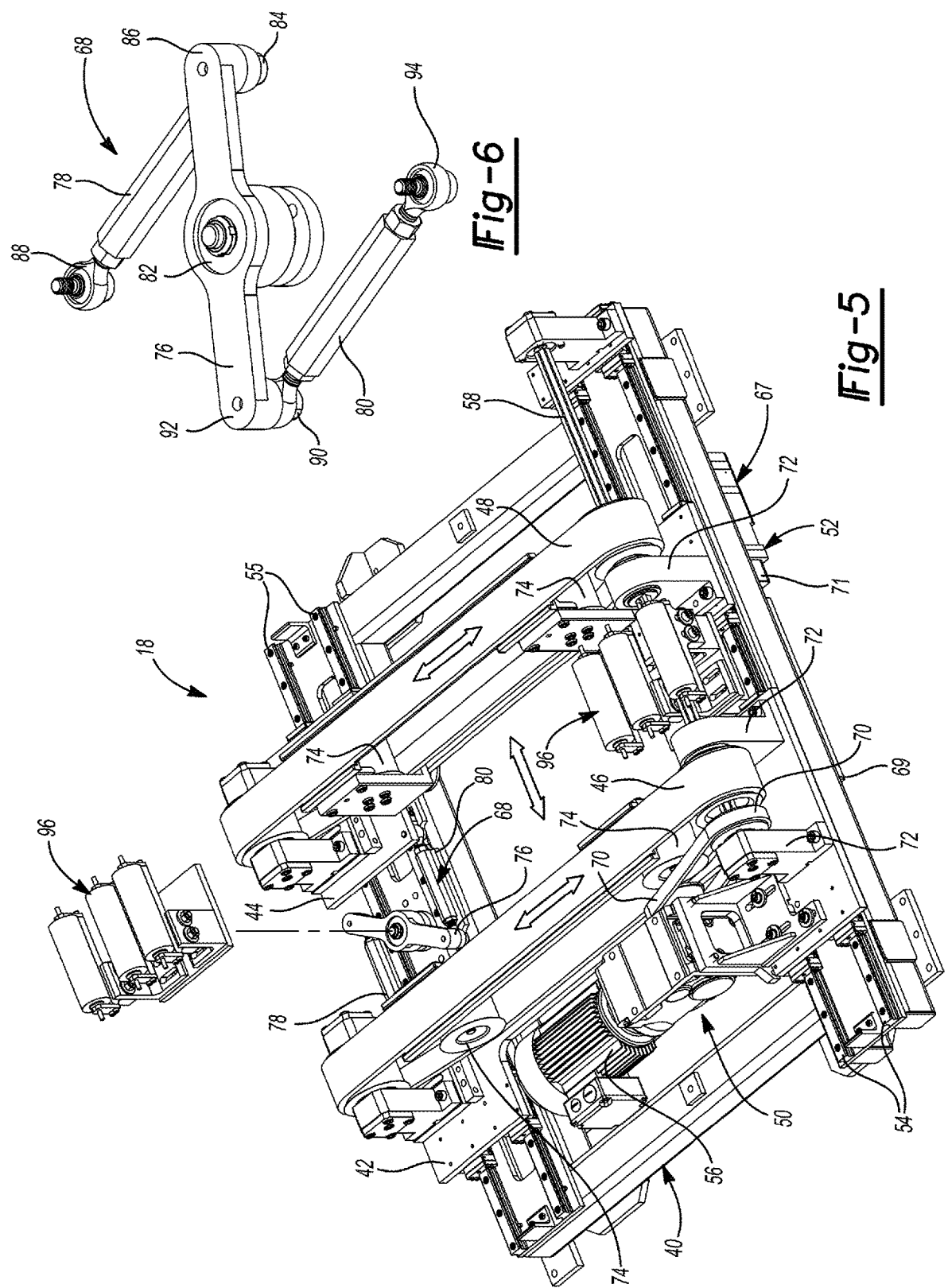

APPARATUS AND METHOD FOR AUTOMATICALLY APPLYING WEIGHT MATERIAL TO A WHEEL

FIELD

The present disclosure relates to the automatic dispensing and applying of weight material to a wheel, in particular to balancing a wheel (e.g., an automobile tire and rim) with such a weight material, more particularly to an apparatus and method for automatically dispensing and applying weight material to a wheel, even more particularly to such an apparatus and method for automatically dispensing and applying two or more types of wheel balancing weights to balance one or more types of wheels, and also more particularly to such an apparatus and method for automatically dispensing two or more types of weight material, separating (e.g., by severing) wheel balancing weights from the two or more types of weight material and applying the wheel balancing weights to balance one or more types of wheels.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Rotational imbalance in a wheel (e.g., a vehicle wheel) can cause vibrations and/or uneven wear when the wheel spins during use. Therefore, prior to installation on the vehicle, one or more weights may be applied to the wheel to correct such rotational imbalance. Balancing machines have been used to determine which location(s) on the wheel require additional weight to rotationally balance the wheel. Based on this information, one or more pieces of a weight material can be applied to the wheel at the identified locations. Equipment for automatically dispensing and applying a balancing weight to the rim of an automobile tire is known. For example, U.S. Pat. No. 8,943,940 discloses such an apparatus for use in balancing a wheel.

The present disclosure provides an apparatus and method for applying weight material onto a wheel at one or more predetermined locations on the wheel.

SUMMARY

This section provides a general summary of the disclosure, and is not a comprehensive disclosure of its full scope or all of its features.

One aspect of the present disclosure provides an apparatus for applying a weight to a wheel, with the apparatus comprising at least one severing device capable of separating a piece of desired weight from each of at least two provided lengths of weight materials, and at least one weight application device capable of applying a severed piece from each of at least two different weight materials to a different location on a wheel.

Another aspect of the present disclosure provides an apparatus for applying a weight material onto a wheel. The apparatus may include a frame, a severing-head assembly, an implementation or control arm, and a conveyor assembly or device. The severing-head assembly may be mounted on the frame and may include a housing, a severing assembly or device (e.g., a cutting device that uses a blade, laser, etc.), and a dispensing mechanism. The dispensing mechanism may position a predetermined amount of the weight material relative to the severing device. The severing device may be mounted for movement relative to the housing to separate the predetermined amount of the weight material from a source (e.g., a spool) of the weight material. The control arm may include a first end movably mounted to the frame and a second end having a weight-application tool configured to transfer the predetermined amount of weight material from the severing-head assembly to the wheel. The conveyor assembly may be mounted on the frame and may include a first conveyor actuator, a second conveyor actuator, a first continuous belt, a second continuous belt, a plurality of first rollers mounted on a first base member and supporting the first continuous belt for continuous-loop movement relative to the first base member, a plurality of second rollers mounted on a second base member and supporting the second continuous belt for continuous-loop movement relative to the second base member. The first conveyor actuator may drive at least one of the first rollers and at least one of the second rollers. The second conveyor actuator may drive the first base member relative to the second base member in a direction that is parallel to rotational axes of the first and second rollers to adjust a spacing between the first and second continuous belts.

In some configurations, at least one of the first and second base members is slidably mounted on a plurality of rails.

In some configurations, the conveyor assembly includes a shaft that is rotatable relative to the first and second base members and rotationally fixed relative to the at least one of the first rollers and the at least one of the second rollers.

In some configurations, the at least one of the second rollers is slidable along an axial length of the shaft.

In some configurations, the conveyor assembly includes a linkage movably coupling the first and second base members to each other. The shaft may be disposed at a first side of the frame, and the linkage may be disposed at a second side of the frame opposite the first side.

In some configurations, the linkage includes a first link, a second link pivotably attached to a first end of the first link and pivotably attached to the first base member, and a third link pivotably attached to a second end of the first link and pivotably attached to the second base member. An intermediate portion of the first link may be pivotably attached relative to the frame.

In some configurations, the first conveyor actuator is attached to one of the first and second base members and is movable with the one of the first and second base members relative to the other of the first and second base members in response to actuation of the second conveyor actuator.

In some configurations, the dispensing mechanism includes a dispensing actuator, a drive roller, an engagement actuator, and a freely-rotating engagement roller. The dispensing actuator may rotatably drive the drive roller about a rotational axis of the drive roller. The drive roller may contact a first side of the weight material. The freely-rotating engagement roller may contact a second opposite side of the weight material. The engagement actuator may translate the freely-rotating engagement roller in a direction perpendicular to the rotational axis of the drive roller.

In some configurations, the dispensing mechanism includes another severing device, a pair of severing-device actuators, another engagement actuator, and another freely-rotating engagement roller. The severing-device actuators may be operable independently of each other to move the severing devices independently of each other. The engagement actuators may be operable independently of each other to translate the freely-rotating engagement rollers independently of each other to selectively and independently cause movement of two different sources (e.g., spools) of weight material.

In some configurations, the severing-head assembly includes a pair of severing devices, and the housing includes first and second lanes receiving first and second predetermined amounts of weight material, respectively. One of the severing devices may separate the first predetermined amount of weight material from a first source (e.g., spool) of weight material. Another one of the severing devices may separate the second predetermined amount of weight material from a second source (e.g., spool) of weight material. The dispensing mechanism may drive the first and second predetermined amounts of weight material through the first and second lanes.

In some configurations, the severing-head assembly includes a liner-guide pin and a plurality of tensioning rollers. The liner-guide pin may be disposed between the severing device and the dispensing mechanism and defines a passageway through which the predetermined amount of the weight material passes while a liner of the weight material wraps around the liner-guide pin and separates from the weight material. The tensioning rollers may engage the removed liner. Two of the tensioning rollers may be translationally fixed relative to the housing. One of the tensioning rollers may be translatable relative to the housing and may be spring biased into engagement with the removed liner.

In some configurations, the severing-head assembly includes a cantilevered weight-material guide that is fixed relative to the housing. The weight-material guide may include a first end, a second end and a curved guide surface extending between the first and second ends. The first end may be disposed proximate a weight-material-outlet of the housing through which the predetermined amount of the weight material passes below the severing device. The guide surface may extend away from the housing to the second end of the weight-material guide.

In some configurations, the weight-application tool includes a curved engagement surface that engages the weight material and faces the guide surface of the weight-material guide during a transfer of the weight material to the weight-application tool.

In some configurations, the engagement surface has a curvature that matches a curvature of the guide surface.

In some configurations, the weight-application tool includes an engagement surface having shape that is curved about a first axis and twisted about a second axis that is perpendicular to the first axis.

In some configurations, the weight-application tool includes an engagement surface that engages the weight material, the engagement surface having helical shape.

Another aspect of the present disclosure provides an apparatus for applying weight material onto a wheel. The apparatus may include a frame, a severing-head assembly or device, and an implementation or control arm. The severing-head assembly may be mounted to the frame and including a housing, a dispensing mechanism, a first severing device and a second severing device. The housing may include first and second lanes receiving first and second predetermined amounts of weight material, respectively. The first severing device may separate the first predetermined amount of weight material from a first source (e.g., spool) of weight material. The second severing device may separate the second predetermined amount of weight material from a second source of weight material. The dispensing mechanism may drive the first and second predetermined amounts of weight material through the first and second lanes. The control arm may be movably mounted to the frame and may include a weight-application tool transferring the first and second predetermined amounts of weight material from the severing-head assembly to first and second locations on the wheel.

In some configurations, the weight material of the first source includes a first cross-sectional shape, and the weight material of the second source includes a second cross-sectional shape.

In some configurations, the weight material of the first source is a different material that the weight material of the second source.

In some configurations, the weight-application tool includes first and second engagement surfaces that simultaneously engage the first and second predetermined amounts of weight material, respectively.

In some configurations, the first and second engagement surfaces have a common axis of curvature. In some configurations, the first and second engagement surfaces have parallel axes of curvature.

In some configurations, the first and second engagement surfaces have first and second axes of curvature, respectively, that are perpendicular to each other.

In some configurations, the apparatus includes a conveyor assembly or device mounted on the frame and including a first conveyor actuator, a second conveyor actuator, a first continuous belt, a second continuous belt, a plurality of first rollers mounted on a first base member and supporting the first continuous belt for continuous-loop movement relative to the first base member, a plurality of second rollers mounted on a second base member and supporting the second continuous belt for continuous-loop movement relative to the second base member. The first conveyor actuator may drive at least one of the first rollers and at least one of the second rollers. The second conveyor actuator may drive the first base member relative to the second base member in a direction that is parallel to rotational axes of the first and second rollers to adjust a spacing between the first and second continuous belts.

In some configurations, at least one of the first and second base members is slidably mounted on a plurality of rails.

In some configurations, the first conveyor actuator is attached to one of the first and second base members and is movable with the one of the first and second base members relative to the other of the first and second base members in response to actuation of the second conveyor actuator.

In some configurations, the conveyor assembly includes a shaft that is rotatable relative to the first and second base members and rotationally fixed relative to the at least one of the first rollers and the at least one of the second rollers.

In some configurations, the at least one of the second rollers is slidable along an axial length of the shaft.

In some configurations, the conveyor assembly includes a linkage movably coupling the first and second base members to each other. The shaft may be disposed at a first side of the frame, and the linkage may be disposed at a second side of the frame opposite the first side.

In some configurations, the linkage includes a first link, a second link pivotably attached to a first end of the first link and pivotably attached to the first base member, and a third link pivotably attached to a second end of the first link and pivotably attached to the second base member. An intermediate portion of the first link may be pivotably attached relative to the frame.

In some configurations, the dispensing mechanism includes a dispensing actuator, a drive roller, first and second engagement actuators, and first and second freely-rotating engagement rollers. The dispensing actuator may rotatably drive the drive roller about a rotational axis of the drive roller. The drive roller may contact a first side of weight material from the first and second sources. The first freely-rotating engagement roller may contact a second opposite side of the weight material from the first source. The second freely-rotating engagement roller may contact a second opposite side of the weight material from the second source. The first engagement actuator may translate the first freely-rotating engagement roller in a direction perpendicular to the rotational axis of the drive roller. The second engagement actuator may translate the second freely-rotating engagement roller in the direction perpendicular to the rotational axis of the drive roller.

In some configurations, the severing-head assembly includes a liner-guide pin and a plurality of tensioning rollers. The liner-guide pin may be disposed between the severing device and the dispensing mechanism and may define a passageway through which the predetermined amount of the weight material passes while a liner of the weight material wraps around the liner-guide pin and separates from the weight material. The tensioning rollers may engage the removed liner. Two of the tensioning rollers may be translationally fixed relative to the housing. One of the tensioning rollers may be translatable relative to the housing and spring biased into engagement with the removed liner.

In some configurations, the severing-head assembly includes a cantilevered weight-material guide that is fixed relative to the housing. The weight-material guide may include a first end, a second end and a curved guide surface extending between the first and second ends. The first end may be disposed proximate a weight-material-outlet of the housing through which the predetermined amount of the weight material passes below the severing device. The guide surface may extend away from the housing to the second end of the weight-material guide.

In some configurations, the weight-application tool includes a curved engagement surface that engages the weight material and faces the guide surface of the weight-material guide during a transfer of the weight material to the weight-application tool.

In some configurations, the engagement surface has a curvature that matches a curvature of the guide surface.

Another aspect of the present disclosure provides an apparatus for applying weight material onto a wheel. The apparatus may include a frame, a conveyor assembly or device, upper and lower severing-head assemblies, and upper and lower control arms. The conveyor assembly is mounted on the frame. The upper severing-head assembly may be mounted on the frame above the conveyor assembly and may include a first housing, a first severing device and a first dispensing mechanism. The first dispensing mechanism may position a first predetermined amount of weight material from a first source relative to the first severing device. The first severing device may be mounted for movement relative to the first housing to separate the first predetermined amount of weight material from the first source. The upper control arm may include a first end movably mounted to the frame above the conveyor assembly and a second end having a first weight-application tool configured to transfer the first predetermined amount of weight material from the upper severing-head assembly to a first location on the wheel. The lower severing-head assembly may be mounted on the frame below the conveyor assembly and may include a second housing, a second severing device, a third severing device and a second dispensing mechanism. The second housing may include first and second lanes receiving second and third predetermined amounts of weight material from second and third sources, respectively. The second dispensing mechanism may drive the second and third predetermined amounts of weight material through the first and second lanes. The second severing device may be mounted for movement relative to the second housing to separate the second predetermined amount of weight material from the second source. The third severing device may be mounted for movement relative to the second housing to separate the third predetermined amount of weight material from the third source. The lower control arm may include a first end movably mounted to the frame below the conveyor assembly and a second end having second and third weight-application tools configured to transfer the second and third predetermined amounts of weight material from the lower severing-head assembly to second and third locations on the wheel.

In some configurations, the conveyor assembly includes a first conveyor actuator, a second conveyor actuator, a first continuous belt, a second continuous belt, a plurality of first rollers mounted on a first base member and supporting the first continuous belt for continuous-loop movement relative to the first base member, and a plurality of second rollers mounted on a second base member and supporting the second continuous belt for continuous-loop movement relative to the second base member. The first conveyor actuator may drive at least one of the first rollers and at least one of the second rollers. The second conveyor actuator may drive the first base member relative to the second base member in a direction that is parallel to rotational axes of the first and second rollers to adjust a spacing between the first and second continuous belts.

In some configurations, at least one of the first and second base members is slidably mounted on a plurality of rails.

In some configurations, the first conveyor actuator is attached to one of the first and second base members and is movable with the one of the first and second base members relative to the other of the first and second base members in response to actuation of the second conveyor actuator.

In some configurations, the conveyor assembly includes a shaft that is rotatable relative to the first and second base members and rotationally fixed relative to the at least one of the first rollers and the at least one of the second rollers.

In some configurations, the at least one of the second rollers is slidable along an axial length of the shaft.

In some configurations, the conveyor assembly includes a linkage movably coupling the first and second base members to each other. The shaft may be disposed at a first side of the frame, and the linkage may be disposed at a second side of the frame opposite the first side.

In some configurations, the linkage includes a first link, a second link pivotably attached to a first end of the first link and pivotably attached to the first base member, and a third link pivotably attached to a second end of the first link and pivotably attached to the second base member. An intermediate portion of the first link may be pivotably attached relative to the frame.

In some configurations, the second dispensing mechanism includes a dispensing actuator, a drive roller, first and second engagement actuators, and first and second freely-rotating engagement rollers. The dispensing actuator may rotatably drive the drive roller about a rotational axis of the drive roller. The drive roller may contact a first side of weight material from the first and second sources. The first freely-rotating engagement roller may contact a second opposite side of the weight material from the second source. The second freely-rotating engagement roller may contact a second opposite side of the weight material from the third source. The first engagement actuator may translate the first freely-rotating engagement roller in a direction perpendicular to the rotational axis of the drive roller. The second engagement actuator may translate the second freely-rotating engagement roller in the direction perpendicular to the rotational axis of the drive roller.

In some configurations, each of the upper and lower severing-head assemblies includes a liner-guide pin and a plurality of tensioning rollers. The liner-guide pin may be disposed between the severing device and the dispensing mechanism and may define a passageway through which the predetermined amount of the weight material passes while a liner of the weight material wraps around the liner-guide pin and separates from the weight material. The tensioning rollers may engage the removed liner. Two of the tensioning rollers may be translationally fixed relative to the housing. One of the tensioning rollers may be spring biased into engagement with the removed liner.

In some configurations, at least one of the upper and lower severing-head assemblies includes a cantilevered weight-material guide that includes a first end, a second end and a curved guide surface extending between the first and second ends.

In some configurations, one of the first, second and third weight-application tools includes a curved engagement surface that engages weight material and faces the guide surface of the weight-material guide during a transfer of the weight material to the weight-application tool.

In some configurations, the engagement surface has a curvature that matches a curvature of the guide surface.

These and other aspects, features and/or advantages of the invention are further shown and described in the drawings and detailed description herein, where like reference numerals are used to represent similar parts. It is to be understood, however, that the drawings and description are for illustration purposes only and should not be read in a manner that would unduly limit the scope of this invention.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a nanoparticle that comprises "a" fluorescent molecule-binding group can be interpreted to mean that the nanoparticle includes "one or more" fluorescent molecule-binding groups.

As used herein, "a," "an," "the," "at least one," and "one or more" are used interchangeably. Thus, for example, a nanoparticle that comprises "a" fluorescent molecule-binding group can be interpreted to mean that the nanoparticle includes "one or more" fluorescent molecule-binding groups.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.
subsumed within that range (1 to 5 includes, e.g., 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through examples, which examples may be used in various combinations. In each instance, the recited examples serve only as a representative group and should not necessarily be interpreted as an exclusive list of examples.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings.

FIG. 5 is another perspective view of the conveyor assembly;

FIG. 6 is a perspective view of a drive linkage of the conveyor assembly;

In the drawings, reference numbers may be reused to identify similar and/or identical elements.

DETAILED DESCRIPTION

Example embodiments will now be described more fully with reference to the accompanying drawings.

Figure 1:
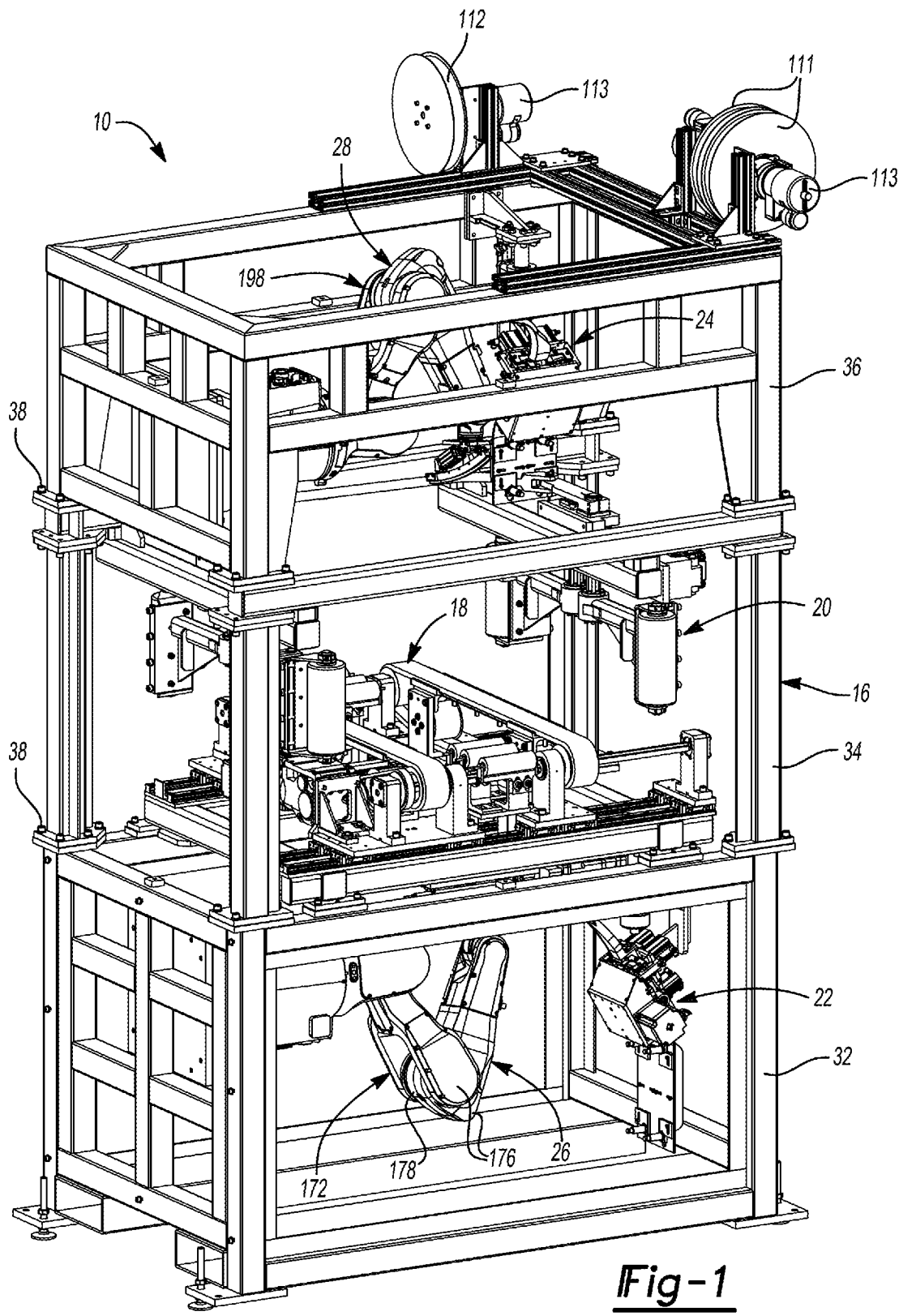
FIG. 1 is a perspective view of an apparatus for dispensing and applying weight material to a wheel according to the principles of the present disclosure.
Figure 2:
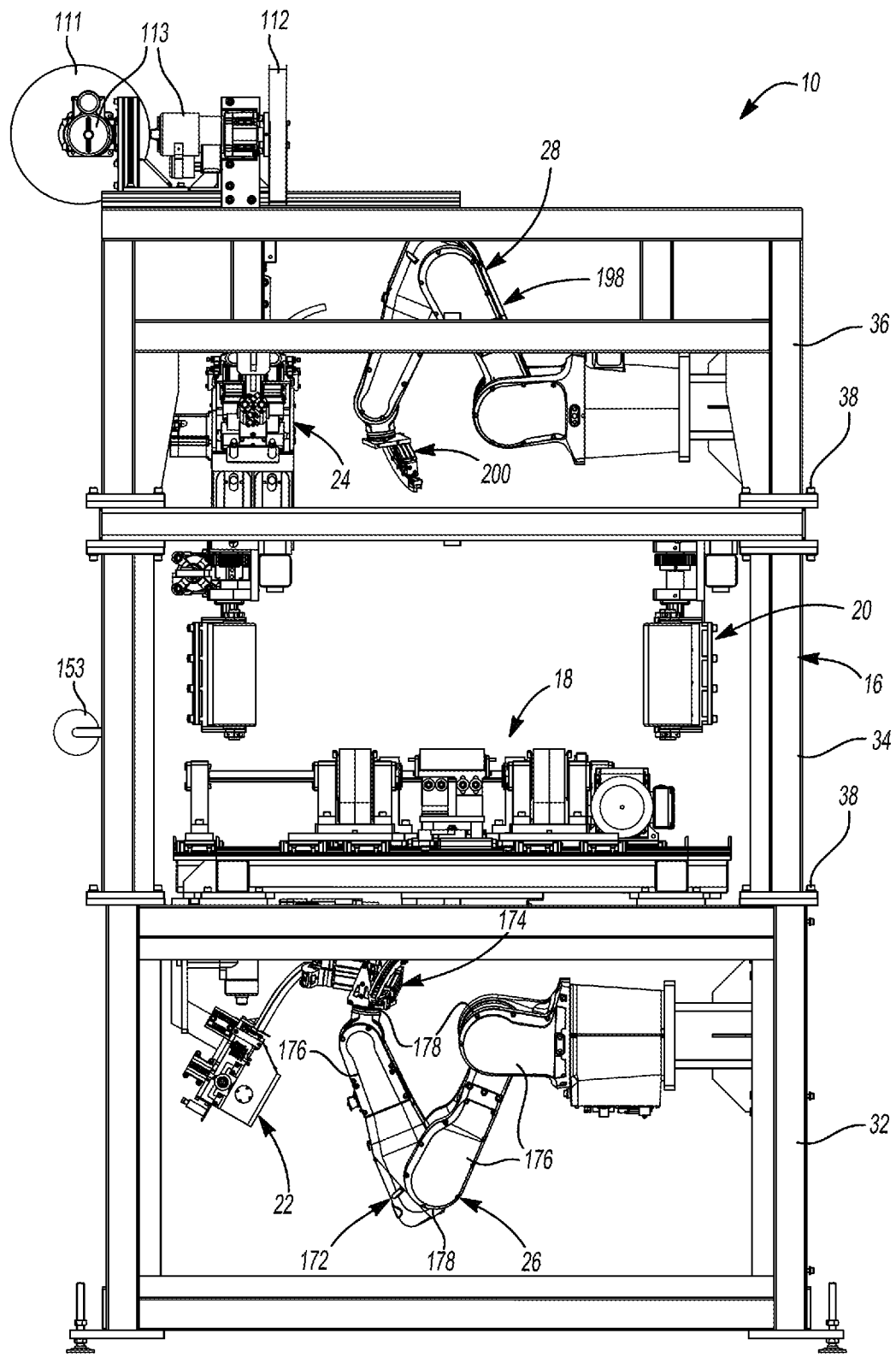
FIG. 2 is a front view of the apparatus of FIG. 1.
Figure 3:
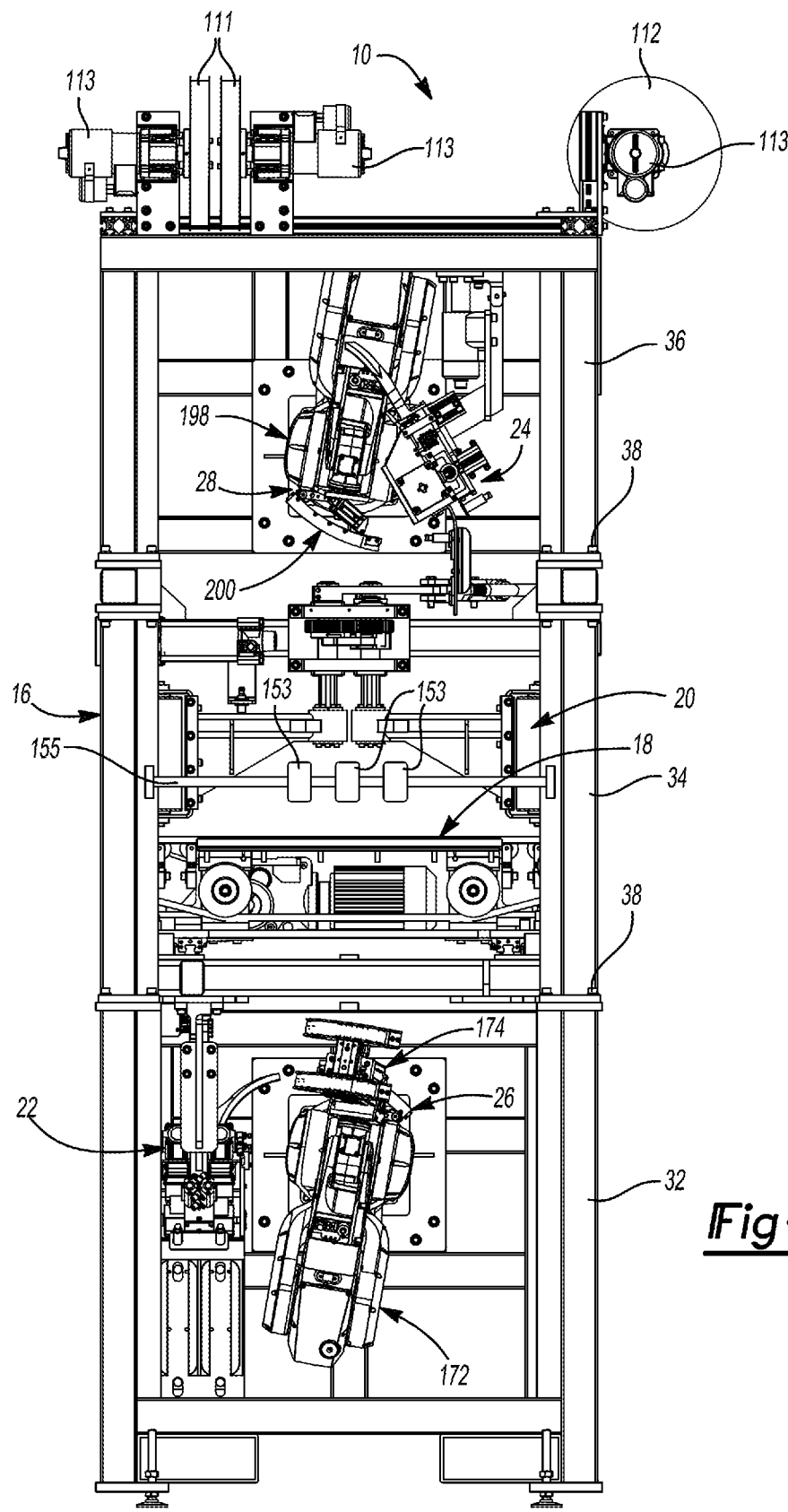
FIG. 3 is a side view of the apparatus of FIG. 1.
Figure 22:
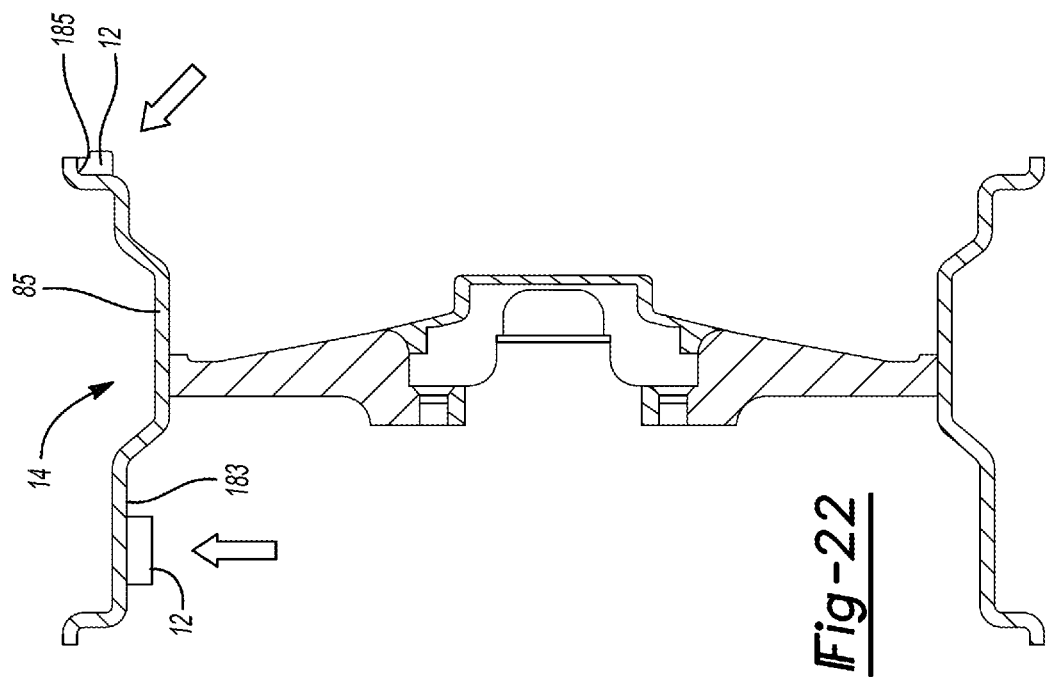
FIG. 22 is a cross-sectional view of a wheel having a plurality of pieces of weight material applied thereto.

With reference to FIGS. 1-3, an apparatus 10 is provided that may apply one or more strips of one or more weight materials 12 onto a wheel 14 (FIG. 22) to rotationally balance the wheel 14. The apparatus 10 may include a frame 16, a conveyor assembly 18, a wheel-crowder assembly 20, a lower severing-head assembly 22, an upper severing-head assembly 24, a lower weight-application apparatus 26, and an upper weight-application apparatus 28. As will be described in more detail below, the conveyor assembly 18 may move the wheel 14 into a predetermined position. The wheel-crowder assembly 20 may center and hold the wheel 14 (FIGS. 8 and 22) on the conveyor assembly 18. The lower and/or upper severing-head assemblies 22, 24 may dispense and cut predetermined lengths of one or more types of weight material 12 from one or more sources such as, e.g., spools 30 (FIG. 9) of the weight material 12. It can be desirable to use a dispensing device capable of dispensing provided lengths of two or more weight materials to the severing device, with each length of provided weight material being severed into pieces of a desired weight. The weight-application apparatuses 26, 28 may apply the one or more lengths of the weight material 12 onto one or more predetermined locations on the wheel 14 (FIG. 22) to rotationally balance the wheel 14. The one or more types of weight material 12 can include weight materials having different cross-sectional profiles (FIG. 22 shows weight materials with first and second cross-sectional profiles) and/or different material compositions.

As shown in FIGS. 1-3, the frame 16 may include a lower frame assembly 32, an intermediate frame assembly 34 and an upper frame assembly 36. The frame assemblies 32, 34, 36 can be fixed to each other by fasteners 38 and/or welding, for example. The lower severing-head assembly 22 and the lower weight-application apparatus 26 may be mounted to the lower frame assembly 32. The conveyor assembly 18 and the wheel-crowder assembly 20 may be mounted to the intermediate frame assembly 34. The upper severing-head assembly 24 and the upper weight-application apparatus 28 may be mounted to the upper frame assembly 36. The lower frame assembly 32 may support the intermediate and upper frame assemblies 34, 36. The intermediate frame assembly 34 may be disposed vertically between the lower and upper frame assemblies 32, 36.

The frame assemblies 32, 34, 36 may have a modular construction that allows the user to configure the apparatus 10 in a desired manner. For example, the user may configure the apparatus 10 in the manner shown in FIGS. 1-3 (i.e., with the lower, intermediate and upper frame assemblies 32, 34, 36 and the components and assemblies mounted thereto); or the apparatus 10 could be configured with only one of the lower and upper frame assemblies 32, 36 if only one of the lower and upper severing-head assemblies 22, 24 and only one of the lower and upper weight-application apparatuses 26, 28 are needed or desired for the user's particular application.

Figure 4:
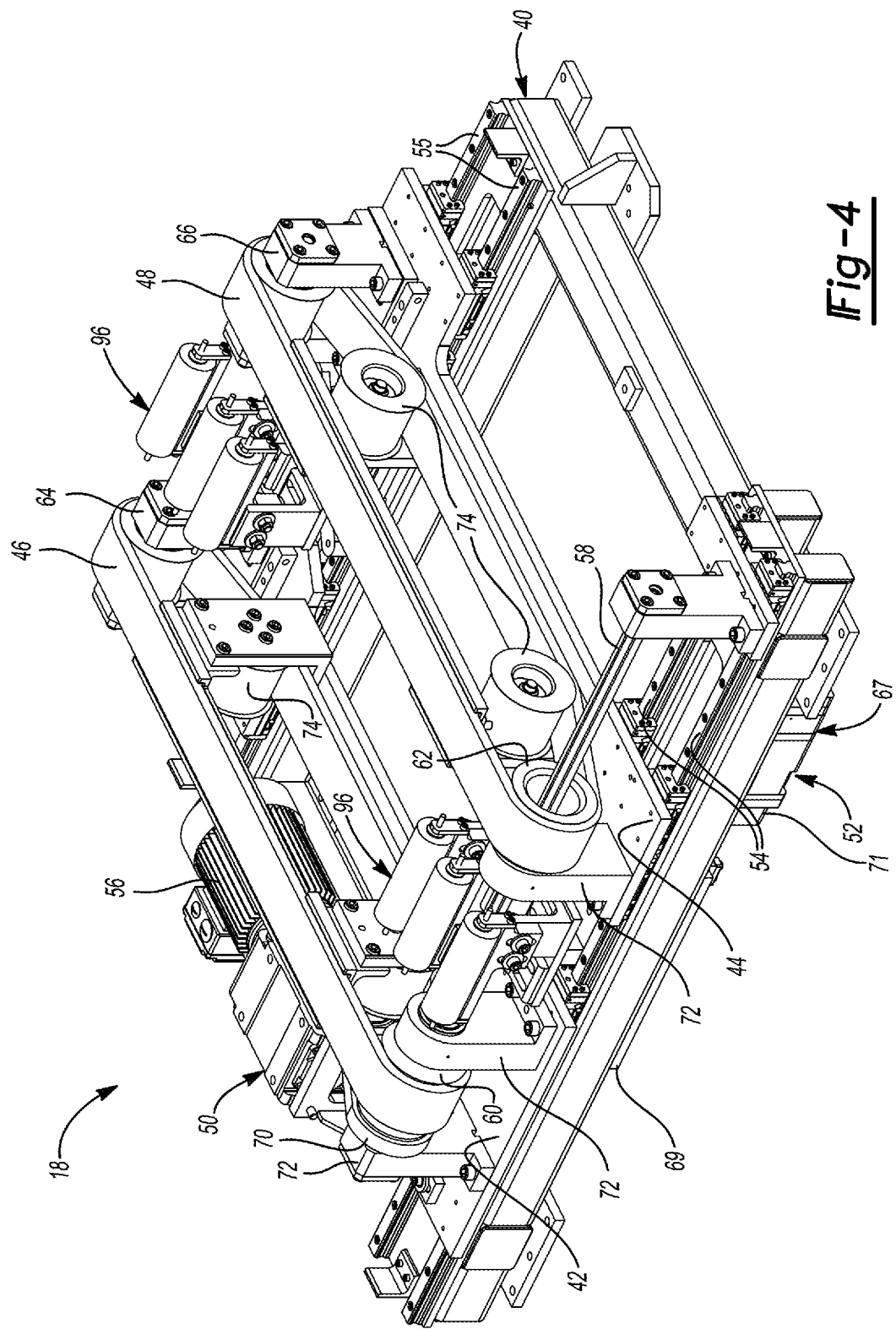
FIG. 4 is a perspective view of a conveyor assembly of the apparatus.

Referring now to FIGS. 4-6, the conveyor assembly 18 may include a base frame 40, first and second movable base platforms 42, 44, a first continuous belt (i.e., conveyor belt) 46, a second continuous belt (i.e., conveyor belt) 48, a first drive mechanism 50, and a second drive mechanism 52. The base frame 40 may be fixedly mounted to the intermediate frame assembly 36 and may support the first and second movable base platforms 42, 44, the first and second continuous belts 46, 48, and the first and second drive mechanisms 50, 52. The first and second base platforms 42, 44 may be slidably mounted on first and second pairs of parallel guide rails 54, 55 that are fixed relative to the base frame 40.

The first drive mechanism 50 may include a first actuator 56, a splined drive shaft 58, first and second drive rollers 60, 62, and first and second freely rotating rollers 64, 66. The first actuator 56 may be a rotary motor (e.g., with a rotor and a stator) and may be mounted on the first base platform 42 and may drivingly engage the drive shaft 58 via a drive belt 70 and/or other transmission device (e.g., a chain, gears, etc.). Each of the first and second base platforms 42, 44 may include one or more journal bearings 72 that rotatably support the drive shaft 58. The first and second drive rollers 60, 62 are rotationally fixed to the drive shaft 58 (i.e., so that the drive rollers 60, 62 rotate with the drive shaft 58) and slidable along the length of the drive shaft 58 (i.e., slidable along the rotational axis of the drive shaft 58).

The first continuous belt 46 is looped around and frictionally engages the first drive roller 60 and the first freely rotating roller 64. The second continuous belt 48 is looped around and frictionally engages the second drive roller 62 and the second freely rotating roller 66. One or more tensioner rollers 74 may engage the first and second continuous belts 46, 48.

The first actuator 56 may be operable in first and second opposite directions such that operation of the first actuator 56 causes corresponding rotation of the drive shaft 58 and the drive rollers 60, 62, which propels the belts 46, 48 in a continuous loop around the drive rollers 60, 62 and the freely rotating rollers 64, 66 in directions perpendicular to the rotational axis of the drive shaft 58. As will be described in more detail below, the belts 46, 48 may support the wheel 14 and may move the wheel 14 into and out of the apparatus 10.

The second drive mechanism 52 may include a second actuator 67 and a drive linkage 68 (FIGS. 5 and 6). The second actuator 67 can be a linear motor or a hydraulic or pneumatic linear actuator, for example, and may include a first end 69 attached to the first base platform 42 and a second end 71 attached to the second base platform 44. In some configurations, one end 69, 71 may be attached to the base frame 40 and the other end 69, 71 may be attached to one of the base platforms 42, 44.

The drive linkage 68 (FIGS. 5 and 6) may extend between and engage the first and second base platforms 42, 44 and is disposed on an opposite side of the base frame 40 from the drive shaft 58. The drive linkage 68 may include a first link 76, a second link 78, and a third link 80. The first link 76 may be mounted to the base frame 40 and is rotatable relative to the base frame 40 about a rotational axis extending through an intermediate portion 82 of the first link 76. A first end 84 of the second link 78 is rotatably attached to one end 86 of the first link 76. A second end 88 of the second link 78 is rotatably attached to the first base platform 42. A first end 90 of the third link 80 is rotatably attached to the opposite end 92 of the first link 76. A second end 94 of the third link 80 is rotatably attached to the second base platform 44.

The second actuator 67 is movable in first and second opposite directions to move the ends 69, 71 of the second actuator 67 toward and away from each other. Operation of the second actuator 67 moves the first and second base platform 42, 44 toward and away from each other, thereby moving the first and second continuous belts 46, 48 toward and away from each other in linear directions parallel to the rotational axis of the drive shaft 58. The drive linkage 68 moves as the first and second base platforms 42, 44 move toward and away from each other to ensure that movement of opposite ends of the base platforms 42, 44 is synchronized so that the base platforms 42, 44 do not bind on the rails 54, 55.

The conveyor assembly 18 may also include two sets of support rollers 96 (FIG. 4) that prevent smaller diameter wheels from falling between the continuous belts 46, 48. The sets of rollers 96 may be positioned on opposite sides of the base frame 40 along a centerline midway between the continuous belts 46, 48. The sets of rollers 96 may be fixed in position along the centerline, and may be adjustable vertically relative to the base frame 40.

Figure 7:
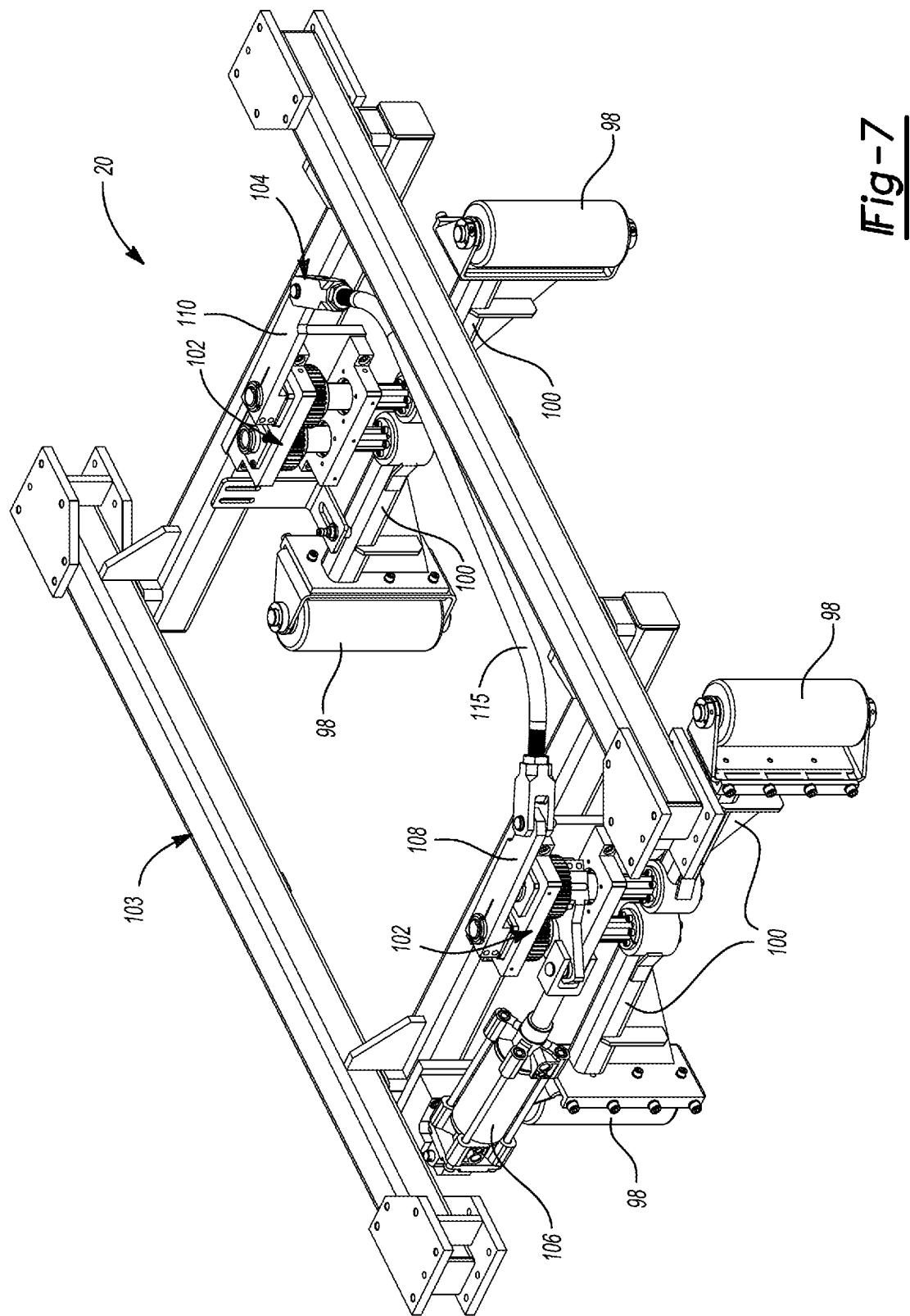
FIG. 7 is a perspective view of a wheel-crowder assembly of the apparatus.
Figure 8:
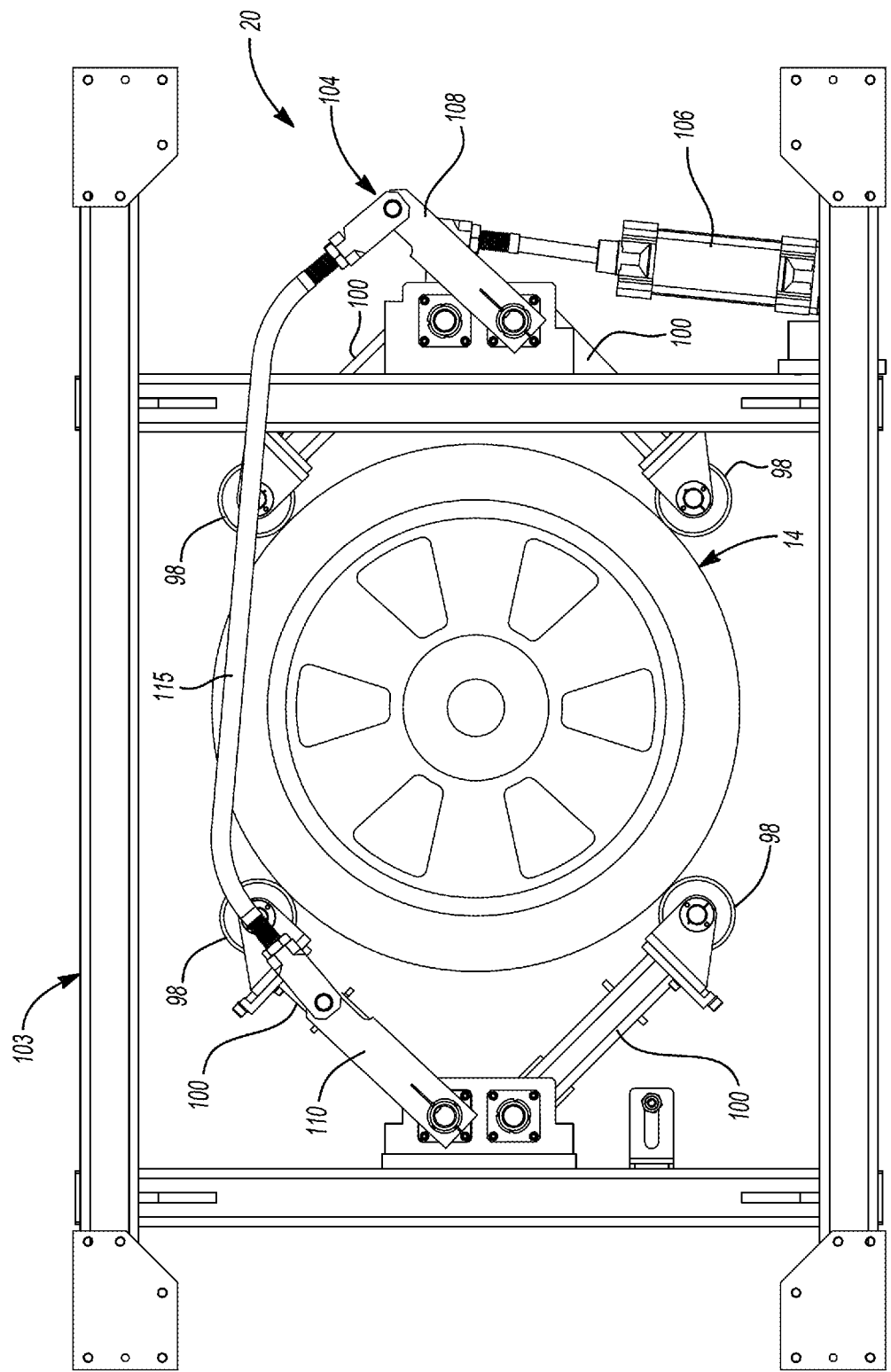
FIG. 8 is a plan view of the wheel-crowder assembly engaging a wheel.

Referring now to FIGS. 7 and 8, the wheel-crowder assembly 20 may be mounted to the intermediate frame assembly 34 above the conveyor assembly 18. The wheel-crowder assembly 20 may be capable of securing the wheel 14 against any movement or at least significant movement (e.g., rotation) relative to the frame 16 during the application of the weight material 12 onto the wheel 14 by one or both of the weight-application apparatuses 26, 28. Movement of the wheel 14 during the application of the weight material 12 is significant if such movement negatively impacts the accurate placement of the pieces of weight material 12 on the wheel 14 (i.e., if the wheel 14 cannot be acceptably balanced by the placement of the weight material pieces 12). The wheel-crowder assembly 20 may align or center a wheel reference axis (e.g., the axis of rotation) of the wheel 14 with a machine reference axis of the apparatus 10, the lower or upper severing-head assembly 22, 24, the lower or upper weight-application apparatus 26, 28, the wheel-crowder assembly 20, or a reference axis shared with two or more thereof. An example wheel-crowder assembly can be found in U.S. Pat. No. 8,943,940, the entire disclosure of which is incorporated herein by reference.

In some configurations, the wheel-crowder assembly 20 can include a plurality of posts 98 (e.g., freely rotating rollers) that can be moved into a position to grip the outer radial periphery of the wheel 14 (as shown in FIG. 8) to center or align the wheel reference axis of the wheel 14 with the machine reference axis, while minimizing rotation of the wheel 14 during such aligning. Each of the posts 98 may be mounted on a distal end of an arm 100. In the configuration shown in the figures, there are two pairs (i.e., four) of such post 98 mounted on two pairs of corresponding arms 100. Proximal ends of the arms 100 forming each pair of arms 100 are mounted to a gear set 102 (FIG. 7) that causes the arms 100 in each pair to move together (in synchronized motion), when either arm 100 is moved. The two gear sets 102 may be mounted on a frame 103 attached to the intermediate frame assembly 34.

The two gear sets 102 may be linked together by a synchronization linkage 104 that causes simultaneous movement of all of the arms 100, and thereby the posts 98, using an actuator 106. The synchronization linkage 104 may include a first link 108 coupled to one of the gear sets 102, a second link 110 coupled to the other gear set 102, and a cross bar 115 rotatably coupled to the first and second links 108, 110. The actuator 106 can be any suitable actuating means such as, for example, an electric cylinder, stepper motor, servo motor, or air cylinder. The actuator 106 may be mounted on the frame 103 and operably connected to one of the gear sets 102, the synchronization linkage 104, or to any one of the arms 100 such that operation of the actuator 106 causes simultaneous movement of all of the arms 100 toward the wheel 14 until the posts 98 are moved into snug contact with the outer circumferential surface of the wheel 14, thereby aligning the wheel reference axis with the machine reference axis.

Referring now to FIGS. 10-14, the lower severing-head assembly 22 may dispense and cut one or more predetermined amounts of weight material 12 from the one or more spools 30 (FIG. 9) of weight material. The lower severing-head assembly 22 also removes a liner (or backing material) 13 (FIGS. 11-13) from the weight material 12 to expose an adhesive layer 15 (FIG. 13) on the weight material 12 that bonds the weight material 12 to the wheel 14.

As shown in FIGS. 10-13, the lower severing-head assembly 22 may include a housing 114, a dispensing mechanism 116, a first severing device in the form of a first cutting device 118 (that uses or is, e.g., a cutting blade, a laser cutter, a water jet cutter, and/or any other cutting or severing tool), a second severing device in the form of a first cutting device 120 that uses or is, e.g., a cutting blade, and a liner-removal mechanism 122. The housing 114 supports the dispensing mechanism 116, first and second cutting devices 118, 120, and a liner-removal mechanism 122. The housing 114 may include guide blocks 123 that at least partially define a first lane or channel 124 and a second lane or channel 126. The lanes 124, 126 may have cross-sectional profiles that are shaped and sized to allow the corresponding weight material 12 to pass therethrough, be directed along a path that extends beneath a corresponding cutting device 118, 120. For example, in the configuration shown in FIG. 11, the first lane 124 may have a cross-sectional profile shaped to receive flange-type weight material 12, and the second lane 126 may have a cross-sectional profile shaped to receive flat-type weight material 12. In other configurations, the first lane 124 may have a cross-sectional profile shaped to receive flat-type weight material 12, and the second lane 126 may have a cross-sectional profile shaped to receive flange-type weight material 12. In other configurations, both of the first and second lanes 124, 126 can have the same cross-sectional profile shape (e.g., both shaped to receive flange-type weight material 12 or both shaped to receive flat-type weight material 12). In configurations where both of the lanes 124, 126 are shaped to receive the same type of weight material 12, the weight material 12 received in the first lane 124 may have a different color, for example, than the weight material 12 received in the second lane 126.

The dispensing mechanism 116 feeds the weight material 12 from one or more of the spools 30 through the first and second lanes 124, 126 (i.e., weight material 12 from one of the spools 30 may be fed through the first lane 124, and weight material 12 from another of the spools 30 may be fed through the second lane 126). The dispensing mechanism 116 is able to simultaneously feed the weight material 12 from two different spools 30 through the first and second lanes 124, 126. The dispensing mechanism 116 is also able to feed weight material 12 from one spool 30 at a time through either of the first and second lanes 124, 126.

The dispensing mechanism 116 may include a dispensing motor 128, a drive roller 130, first and second engagement rollers 132, 134, and first and second engagement actuators 136, 138. The dispensing motor 128 drivingly engages the drive roller 130 to cause rotation of the drive roller 130 about a rotational axis that extends perpendicular to the direction in which the weight material 12 is dispensed through the lanes 124, 126. The drive roller 130 extends along its rotational axis across both of the lanes 124, 126 and contacts one side of the weight material 12 passing through both of the lanes 124, 126.

The engagement rollers 132, 134 may be freely rotating rollers. The first and second engagement actuators 136, 138 are drivingly connected to the first and second engagement rollers 132, 134, respectively, to independently linearly translate the first and second engagement rollers 132, 134 toward and away from the weight material 12 in the first and second lanes 124, 126. In other words, the first and second engagement rollers 132, 134 are linearly translatable toward and away from the drive roller 130 such that the first and second engagement rollers 132, 134 can contact the strips of weight material 12 in the first and second lanes 124, 126, respectively, to urge the strips of weight material 12 in the first and second lanes 124, 126 into more intimate contact with the drive roller 130 (i.e., to increase the friction between the drive roller 130 and the weight material 12). The engagement actuators 136, 138 could be or include stepper motors, solenoids, servo motors, pneumatic actuators, or hydraulic actuators, for example, or any other suitable type of actuator.

In this manner, the dispensing mechanism 116 can cause movement of the weight material 12 in either or both of the lanes 124, 126 by moving the engagement rollers 132, 134 toward the drive roller 130 to press the weight material 12 into contact with the drive roller 130, which allows the drive roller 130 to drive the weight material 12 through the lanes 124, 126. The amount (i.e., length) of weight material 12 dispensed by the dispensing mechanism 116 can be controlled by the amount of time over which the engagement rollers 132, 134 urge the weight material 12 against the drive roller 130 and/or by the rotational speed of the drive roller 130.

Figure 12:
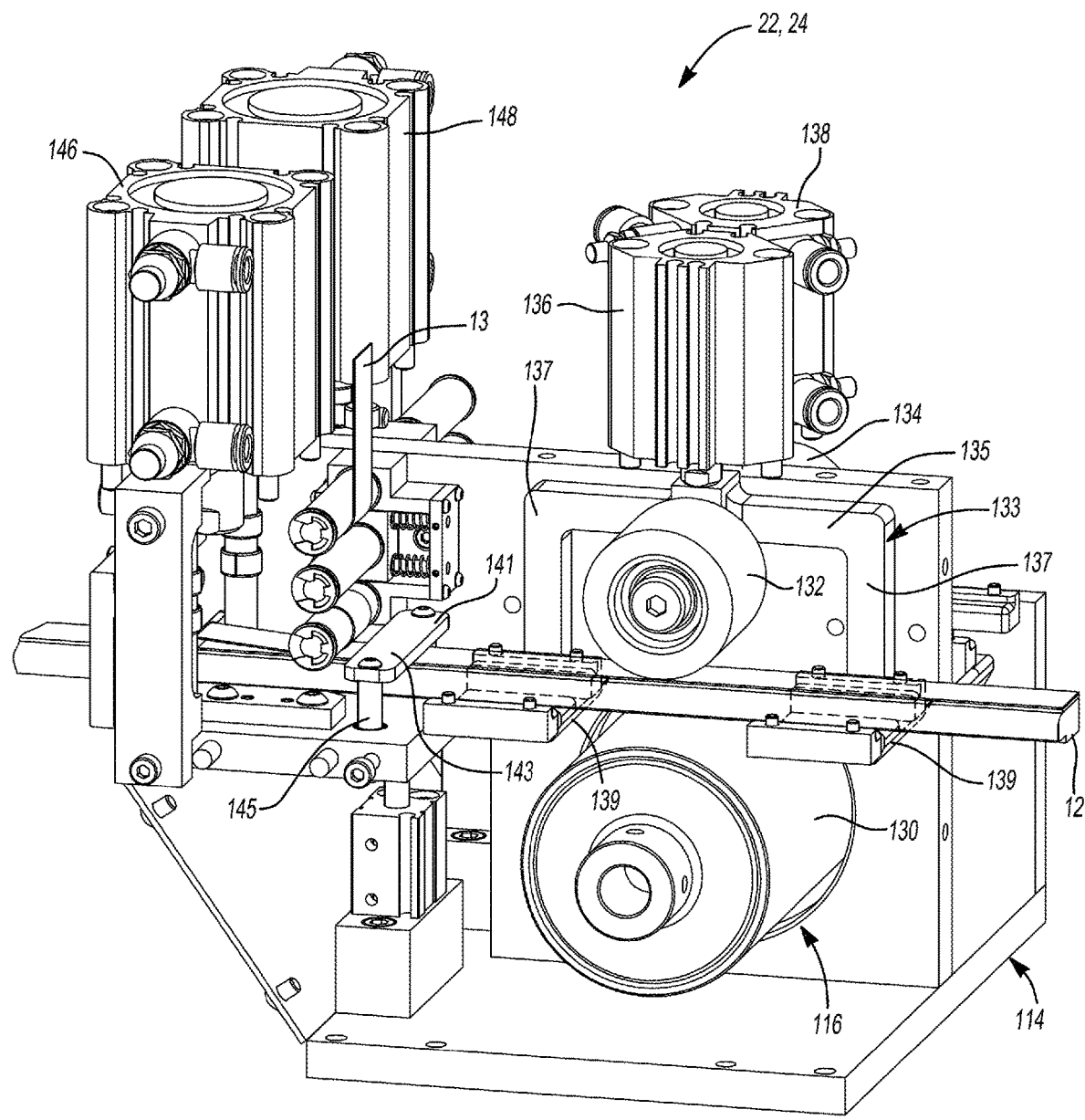
FIG. 12 is a perspective view of the severing-head assembly with portions of a housing and guide blocks removed.
Figures 13, 14:
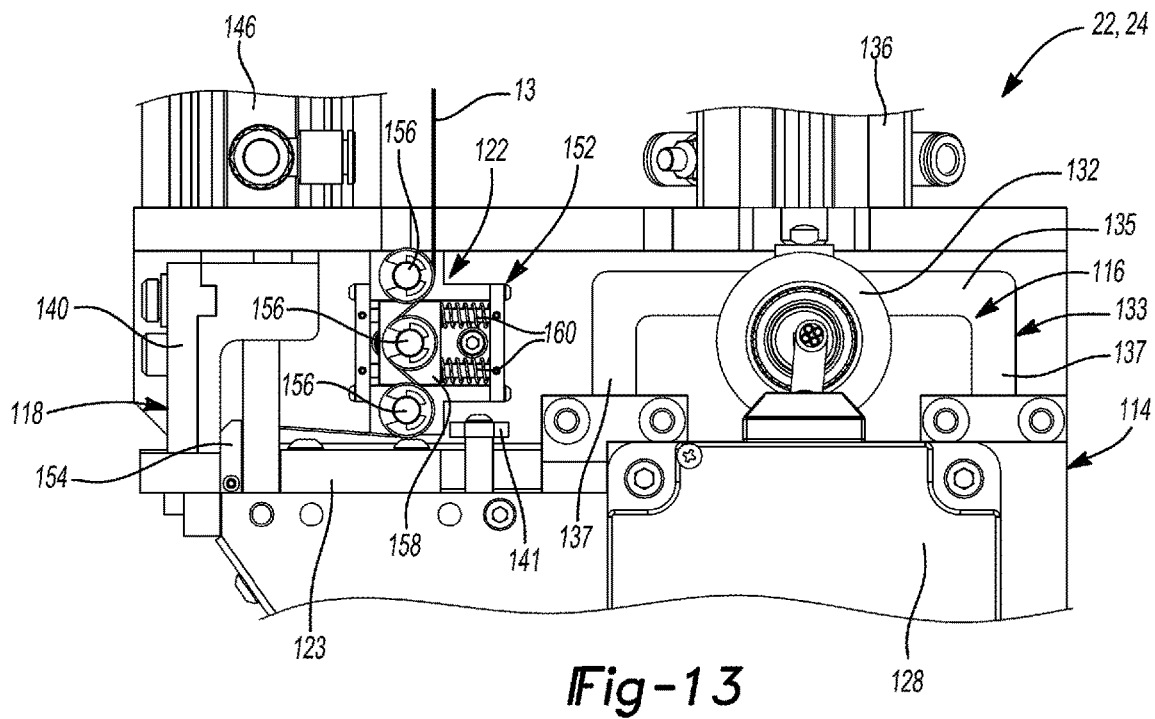
FIG. 13 is a partial side view of the severing-head assembly.
FIG. 14 is a partial perspective view of the severing-head assembly.

In some configurations, each of the engagement rollers 132, 134 may be mounted to a lift arm 133 (FIG. 12) that is movable with the engagement roller 132, 134 in a direction perpendicular to a direction in which the weight material 12 is dispensed through the dispensing mechanism 116. As shown in FIG. 12, the lift arms 133 may be generally U-shaped members including a cross member 135 and arms 137 extending from opposite ends of the cross member 135. A distal end of each arm 137 may include a flange 139 that extends perpendicular to the arm 137.

As shown in FIG. 12, the weight material 12 may be disposed between the engagement roller 132, 134 and the flanges 139 such that when the engagement roller 132, 134 is translated away from the drive roller 130 (i.e., in the direction perpendicular to the direction in which the weight material 12 is dispensed through the dispensing mechanism 116), the flanges 139 can lift the weight material 12 off of the drive roller 130 so that the drive roller 130 is no longer contacting the weight material 12. When the weight material 12 is not contacting the drive roller 130, the weight material 12 does not move in the dispensing direction through the dispensing mechanism 116. In some configurations, in addition to lifting the weight material 12 off of the drive roller 130, the flanges 139 may press the weight material 12 against upper inner sides of the guide blocks 123 to prevent movement of the weight material 12.

In some configurations, a weight material clamp 141 (FIGS. 11 and 12) can selectively clamp down on the weight material 12 to further restrict movement of the weight material 12 in the dispensing direction and prevent unwanted dispensing of the weight material 12. The weight material clamp 141 may include a gripper top plate 143 and an actuating device 145 (e.g., a hydraulic or pneumatic actuating cylinder or any other actuating device) that moves the gripper top plate 143 into contact with the weight material 12 to clamp the weight material 12 relative to the housing 114.

To resume the dispensing of the weight material 12, the weight material clamp 141 can release (unclamp) the weight material 12, the lift arm 133 can lower the weight material 12 back onto the drive roller 130, and the engagement roller 132, 134 can press the weight material 12 against the drive roller 130 to increase driving friction between the drive roller 130 and the weight material 12, as described above.

Figure 9:
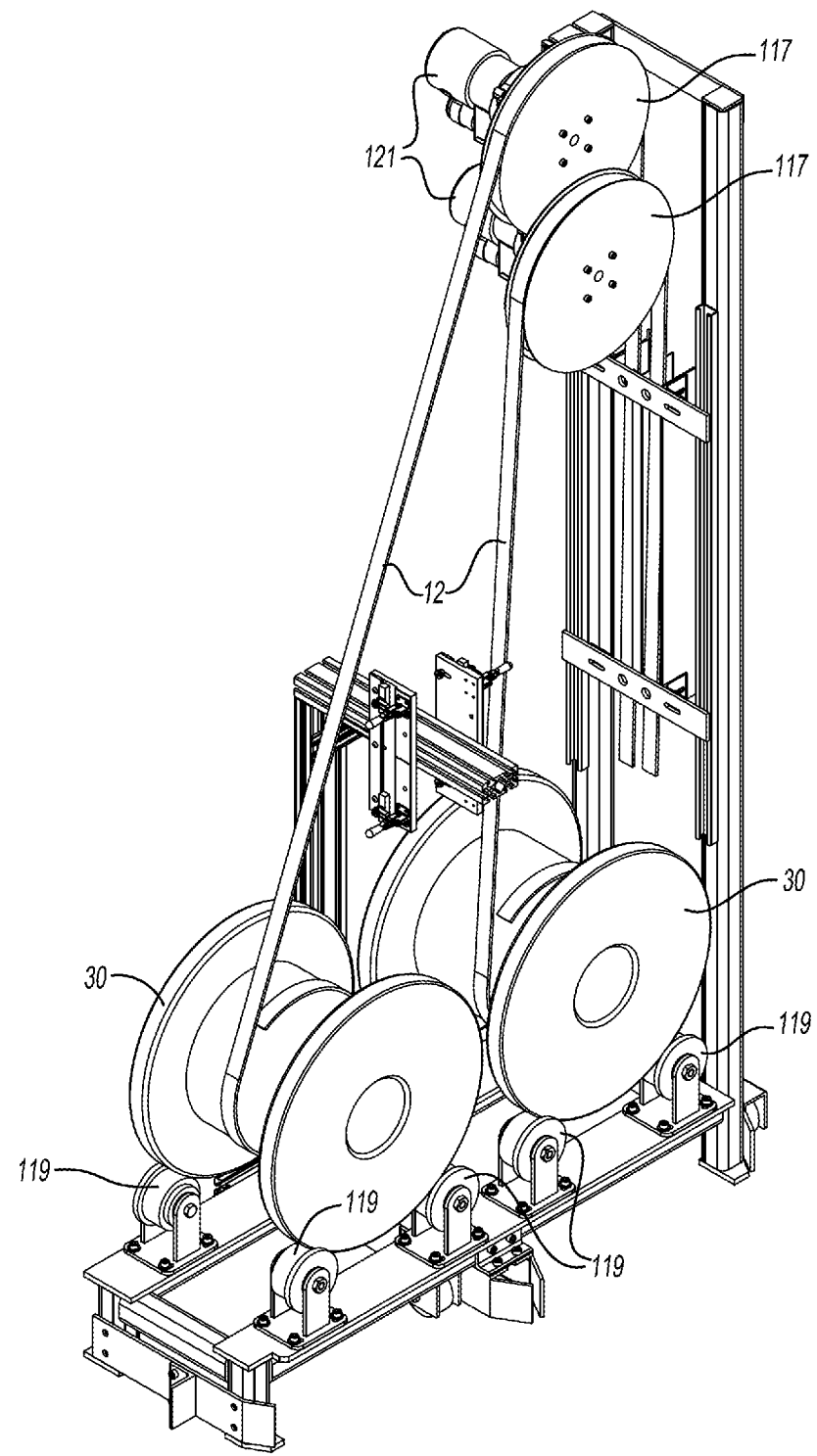
FIG. 9 is a perspective view of two spools of weight material and rollers that drive the weight material off of the spools.

In some configurations, guide rollers 117 (FIG. 9) may guide the weight material 12 pulled from the spools 30 before entering the severing-head assembly 22, 24. As shown in FIG. 9, each spool 30 may rest upon a plurality of freely rotatable spool rollers 119, which allow each spool 30 to freely rotate about its axis of rotation. Motors 121 drivingly coupled to the guide rollers 117 may at least assist in, mostly cause, or completely cause the pulling of the weight material 12 from the spools 30.

After the weight material 12 passes its corresponding guide roller 117, the weight material 12 may pass over one of a plurality of rotatable feeder rollers 111, 112 (FIGS. 1-3) before going into its corresponding severing-head assembly 22, 24. In some configurations, each feeder roller 111, 112 may be driven by one of a plurality of actuators 113. The actuators 113 can be any suitable actuator such as, for example a stepper motor or servo motor. In some configurations, each feeder roller 111, 112 may have a circumferential groove with an interior profile dimensioned to generally match and receive the exterior profile of a corresponding type of weight material 12. In some configurations, the weight material 12 from the two rollers 111 may travel to the two lanes 124, 126 of the lower severing-head assembly 22, and the weight material from the roller 112 may travel to the upper severing-head assembly 24.

Figure 10:
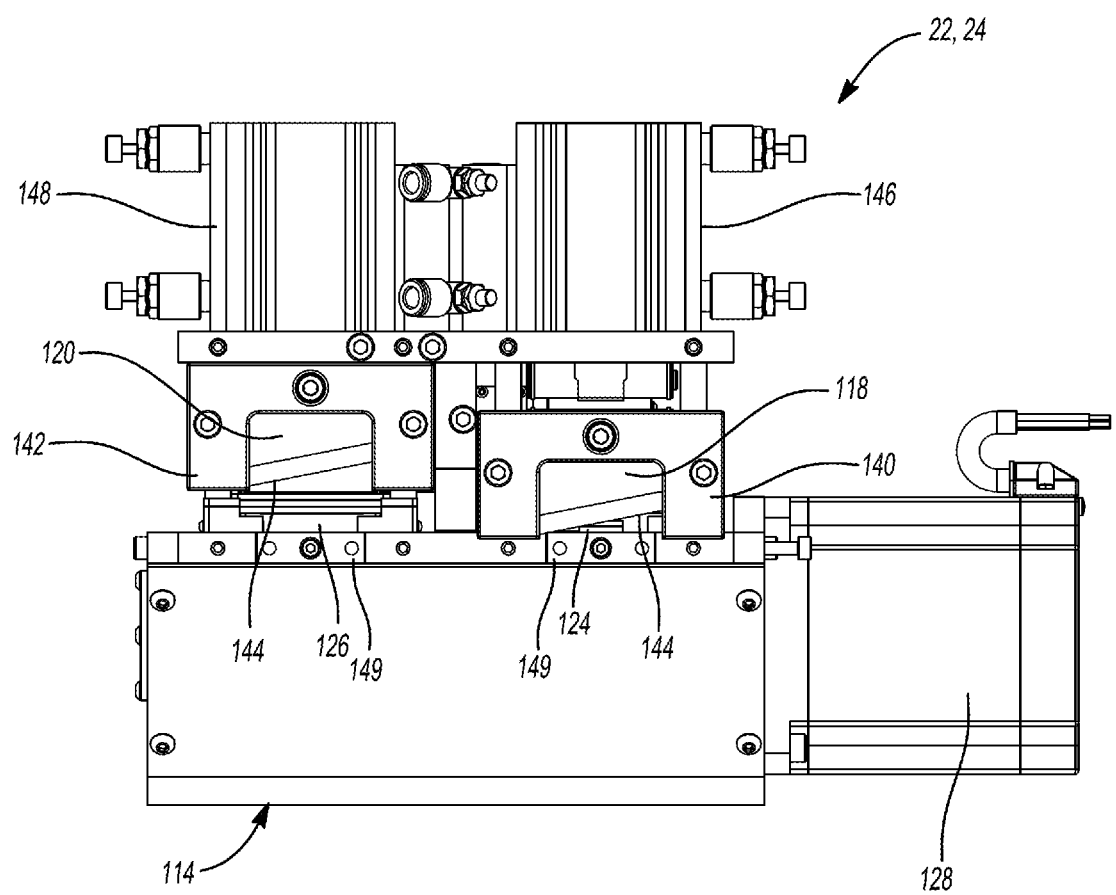
FIG. 10 is a front view of a severing-head assembly of the apparatus.
Figure 11:
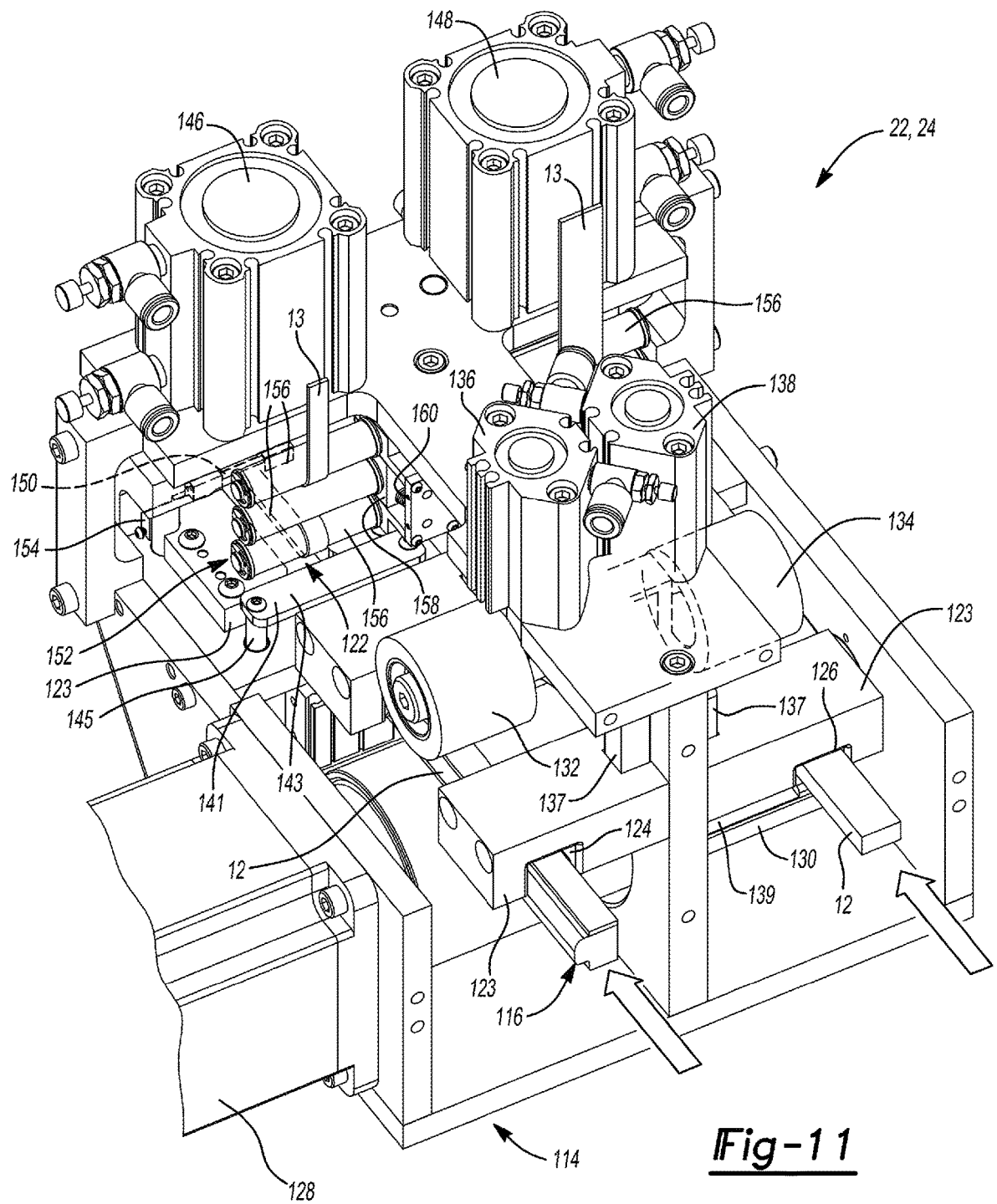
FIG. 11 is a perspective view of the severing-head assembly.

The first and second cutting devices 118, 120 may be or include one or more cutting blades (as shown in FIG. 10), lasers and/or any other severing or cutting tool. The first and second cutting devices 118, 120 are mounted to first and second cut-head blocks 140, 142, respectively. The cutting devices 118, 120 may be positioned within the cut-head blocks 140, 142 such that sharp, cutting edges 144 of the cutting devices 118, 120 are disposed at an acute angle relative to a plane along which the weight material 12 is dispensed. A first severing actuator 146 and a second severing actuator 148 are mounted to the housing 114 and are drivingly coupled to the first and second cut-head blocks 140, 142, respectively. Operation of the first and second severing actuators 146, 148 causes translation of the first and second cut-head blocks 140, 142 (and thus, the cutting devices 118, 120) toward and away from the weight material 12 in the first and second lanes 124, 126, respectively. The first and second severing actuators 146, 148 may be or include stepper motors, solenoids, servo motors, pneumatic actuators, or hydraulic actuators, for example, or any other suitable type of actuator. The first and second severing actuators 146, 148 are operable independently of each other.

A control module may selectively operate the severing actuators 146, 148 to cut the weight material 12 after a predetermined amount of the weight material 12 has been dispensed from one or both of the lanes 124, 126. The predetermined amounts of the weight material 12 may be selected to be an amount of weight material 12 needed for application at a particular location of the wheel 14 for purposes of rotationally balancing the wheel 14.

As shown in FIG. 10, a wear plate or cutter anvil 149 (made, e.g., of tool steel) can be used to back each cutting device 118, 120 that cuts through the weight material 12. The blades of the cutting devices 118, 120 may make contact with the upper edge of the cutter anvil 149, which causes wear to the cutter anvil 149. Therefore, in some configurations, the cutter anvil 149 may be selectively repositionable (e.g., selectively rotatable about a centrally located pin fastener) to replace the original upper edge with the lower edge, after the original upper edge (i.e., the surface being contacted by the blade of the corresponding cutting device 118, 120) exhibits significant wear (e.g., enough wear to adversely impact the performance and/or accuracy of the severing-head assembly 22).

Referring now to FIGS. 11-14, the liner-removal mechanism 122 may remove the liner 13 from the weight material 12 in the lanes 124, 126 before the weight material 12 is severed by the cutting devices 118, 120. The liner-removal mechanism 122 may include a plurality of liner-guide pins 150 and a liner-tensioning device 152. The housing 114 may include a pair of mounting blocks 154 that partially define the lane 124 and another pair of mounting blocks 154 that partially define the lane 126. Each pair of mounting blocks 154 has one or more of the liner-guide pins 150 mounted thereto. The liner-guide pins 150 extend across a corresponding one of the lanes 124, 126 (i.e., in a direction perpendicular to the dispensing direction of the weight material 12 through the lanes 124, 126). In the configuration depicted in FIG. 14, each pair of mounting blocks 154 has two liner-guide pins 150 mounted thereto.

As the weight material 12 passes beneath the liner-guide pins 150, the liner 13 gets wrapped around the liner-guide pins 150 and separated from the weight material 12. From the liner-guide pins 150, the liner 13 is fed into the liner-tensioning device 152. The liner-tensioning device 152 may include two stacks of three tensioning rollers 156 (one stack for each lane 124, 126). A middle one of the tensioning rollers 156 may be mounted to a support block 158 that is spring-loaded by one or more springs 160 in a direction perpendicular to the rotational axes of the tensioning rollers 156. Spring-loading the middle one of the tensioning rollers 156 maintains tension on the length of liner 13 located between the corresponding liner-guide pins 150 and the liner-tensioning device 152. Routing the liner 13 around the liner-guide pins 150 prevents the adhesive bond between the liner 13 and the weight material 12 from lifting the weight material 12 as the liner 13 is removed.

As shown schematically in FIGS. 2 and 3, a plurality of motor-driven rollers 153 may be mounted to the frame 16 and may engage the strips of liner 13 that have been removed by the lower and upper severing-head assemblies 22, 24. The rollers 153 may guide the removed liner 13 out of the apparatus 10 and may assist in driving or completely drive the liner 13 out from the liner-removal mechanism 122. In some configurations, the rollers 153 may be driven by a common shaft 155. Clutches may selectively rotationally engage and disengage the shaft 155 to selectively drive one or more of the rollers 153 while allowing one or more of the rollers 153 to be idle.

Figure 15:
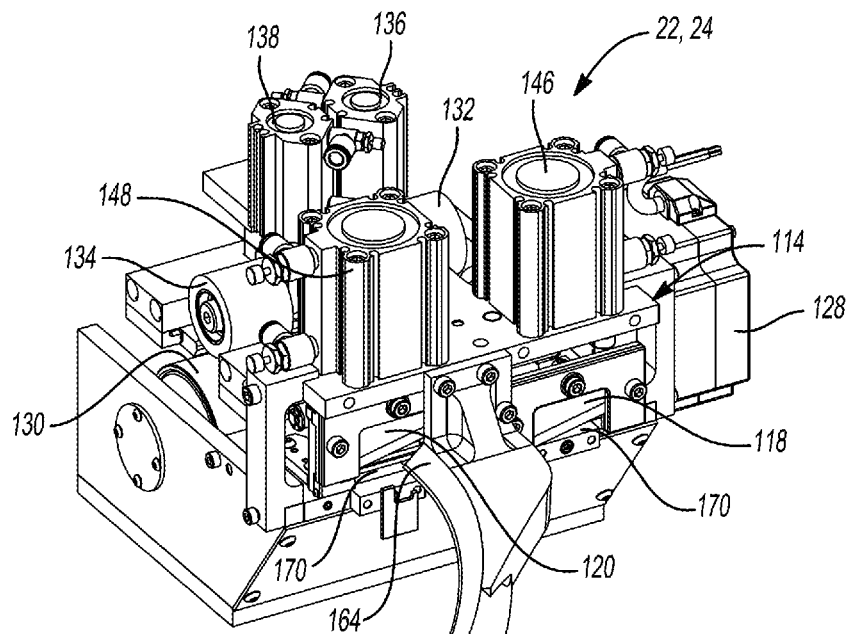
FIG. 15 is a perspective view of the severing-head assembly with a material guide mounted thereto.
Figure 16:
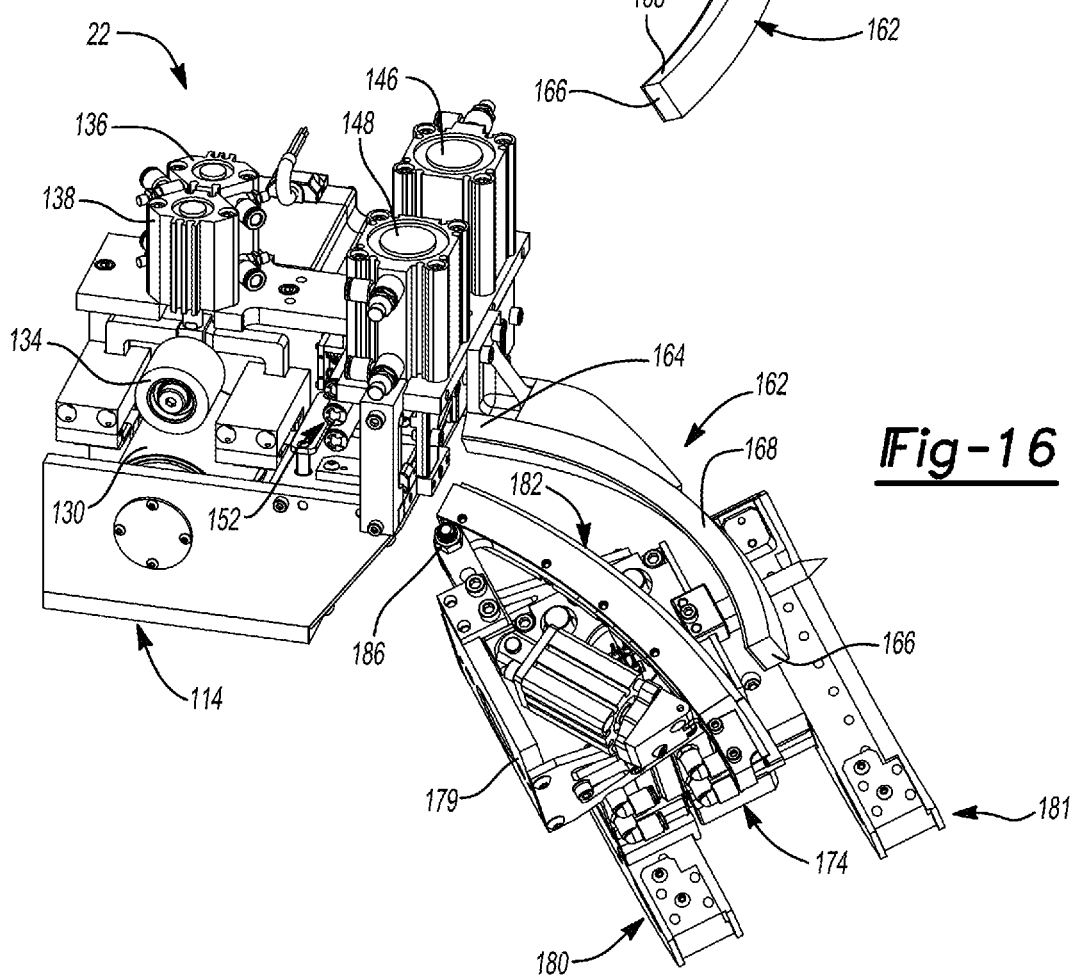
FIG. 16 is a perspective view of the severing-head assembly, material guide, and a weight-application tool of the apparatus.
Figure 17:
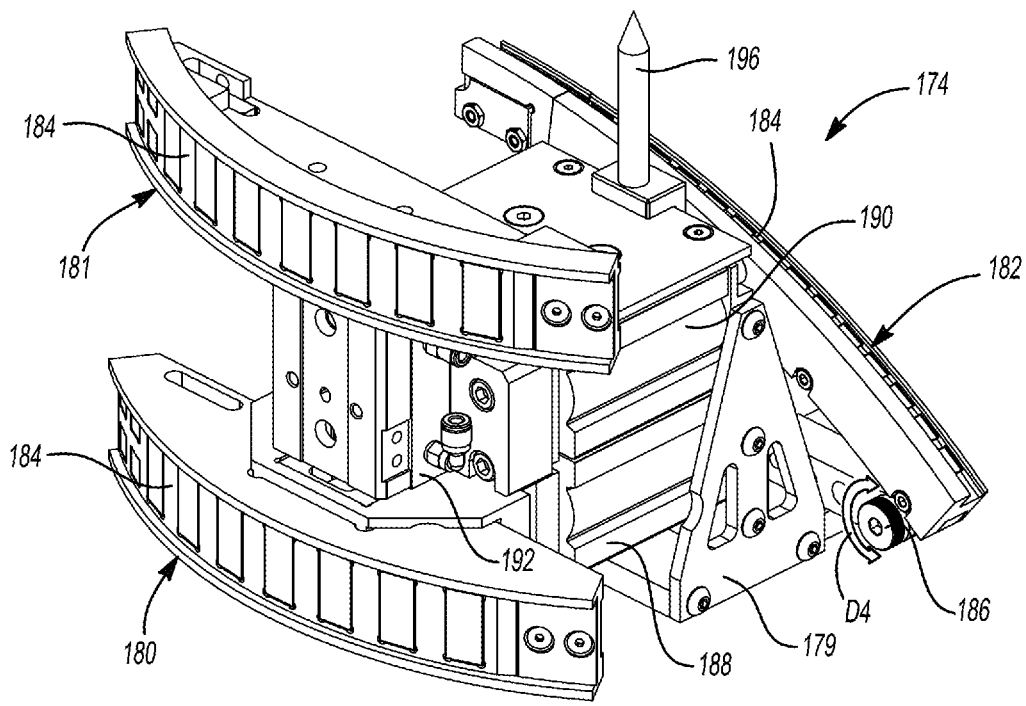
FIG. 17 is a perspective view of the weight-application tool.

Referring now to FIGS. 15 and 16, in some configurations, the lower severing-head assembly 22 may include one or more weight-material guides 162 fixed to and extending outward from the housing 114. The weight-material guide 162 includes a first end 164 fixed to the housing 114, a second cantilevered end 166 and a curved guide surface 168 extending from the first end 164 to the second end 166. The first end 164 is positioned proximate to a weight-material-outlet 170 of one of the lanes 124, 126 such that weight material 12 dispensed from the severing-head assembly 22 (i.e., dispensed out of the weight-material-outlet 170) can slide along the curved guide surface 168, thereby bending the dispensed weight material 12 into a curved shape that substantially matches the curved shape of the curved guide surface 168. Bending the dispensed weight material 12 into the curved shape may facilitate attachment of the dispensed weight material 12 onto a weight-application tool (an end-of-arm tool) 174 of the weight-application apparatus 26.

The structure and function of the upper severing-head assembly 24 can be similar or identical to that of the lower severing-head assembly 22, and therefore, will not be described again in detail. That is, the upper severing-head assembly 24 may include some or all of the features described above and/or shown in the drawings with respect to the lower severing-head assembly 22. In some configurations, however, the upper severing-head assembly 24 may have only a single lane 124 (as opposed to first and second lanes 124, 126) and only a single cutting device 118 (as opposed to first and second cutting devices 118, 120) or any number of lanes 124, 126 and cutting devices 118, 120.

Referring now to FIG. 2, the lower weight-application apparatus 26 may include a robotic lower control arm 172 and the weight-application tool (end-of-arm tool) 174 disposed at a distal end of the lower control arm 172. The lower control arm 172 is rotatably coupled at a proximal end to the lower frame assembly 32 beneath the conveyor assembly 18. The lower control arm 172 may include a plurality of arm segments 176 and a plurality of articulating joints 178 (e.g., pivoting joints) movably coupling the arm segments 176 to each other and movably coupling the weight-application tool 174 to one of the arm segments 176. Actuators (e.g., electric motors, pneumatic actuators, and/or hydraulic actuators) can be drivingly connected to the arm segments 176 to cause movement of one or more of the arm segments 176 relative one or more other arm segments and the frame 16.

Referring now to FIGS. 16-19, the weight-application tool 174 is capable of receiving one or more predetermined amounts of one or more weight material 12 (i.e., one piece of weight material 12 at a time or multiple pieces at one time) from the lower severing-head assembly 22 and applying the weight material 12 onto one or more predetermined locations on the wheel 14.

The weight-application tool 174 may include a base 179, one or more flat-weight wet-out tools (e.g., first and second flat-weight wet-out tools 180, 181) mounted to the base 179, and one or more flange-weight wet-out tools 182 mounted to the base 179. One of the articulating joints (e.g., a pivoting joint) 178 may connect the base 179 to the control arm 172. The flat-weight wet-out tools 180, 181 can be used to apply one or more pieces of weight material 12 onto one or more flat surfaces (e.g., a flat surface 183 (FIG. 22) on the car side or curb side of a wheel rim 85) of the wheel 14 (see, e.g., the wet-out tools of U.S. Pat. No. 8,943,940). The flange-weight wet-out tool 182 can be used for applying a piece of weight material 12 onto a flange surface (e.g., the inside radius of curvature of a flange lip 185 (FIG. 22) of a wheel rim flange) of the wheel 14. The flange-weight wet-out tool 182 can be located adjacent or directly connected to one of the articulating joints 178 (e.g., a pivoting joint) of the control arm 172. Each of the wet-out tools 180, 181, 182 can have a curve engagement surface 184 (i.e., a curved weight-receiving/applying face) on which a piece of weight material 12 is attached, before the weight material is applied to the wheel 14. The pieces of weight material 12 can be attached to the curved engagement surface 184 by magnetic attraction, vacuum, a light snap-fit, and/or any other suitable means. The engagement surfaces 184 may have radii of curvature that substantially match the curvature of the guide surface 168 of the weight-material guide 162.

The example weight-application tool 174 shown in FIGS. 16-19 includes the first and second flat-weight wet-out tools 180, 181 and one flange-weight wet-out tool 182. In some configurations, the first flat-weight wet-out tool 180 is moveable relative to the base 179 only in a direction D1 (FIG. 19) perpendicular to its arc-shaped engagement surface 184. The second flat-weight wet-out tools 181 may be moveable relative to the base 179 in a direction D2 (FIG. 19) perpendicular to its engagement surface 184 and in another direction D3 (FIG. 19) orthogonal thereto. The flange-weight wet-out tool 182 can pivot in a direction D4 (FIG. 17) (e.g., within a plane that is perpendicular to the direction of movement of wet-out tool 180) relative to the base 179 about a rotational axis defined by a fastener 186 extending through the base 179 and an end of the flange-weight wet-out tool 182.

Figure 18:
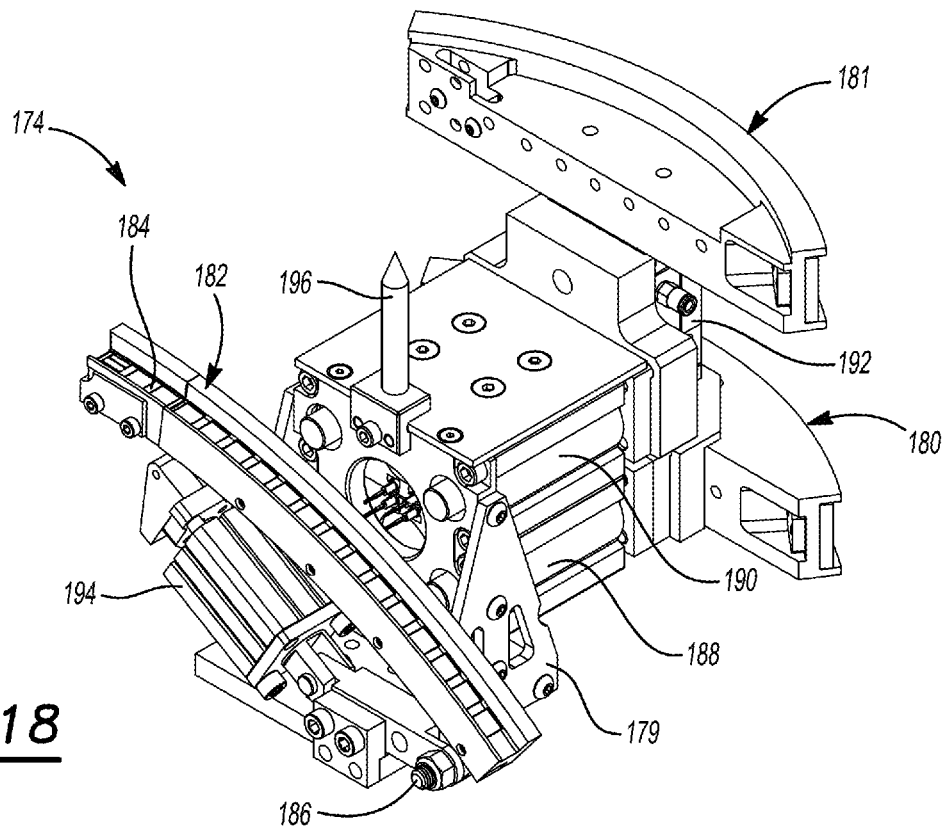
FIG. 18 is another perspective view of the weight-application tool.
Figure 19:
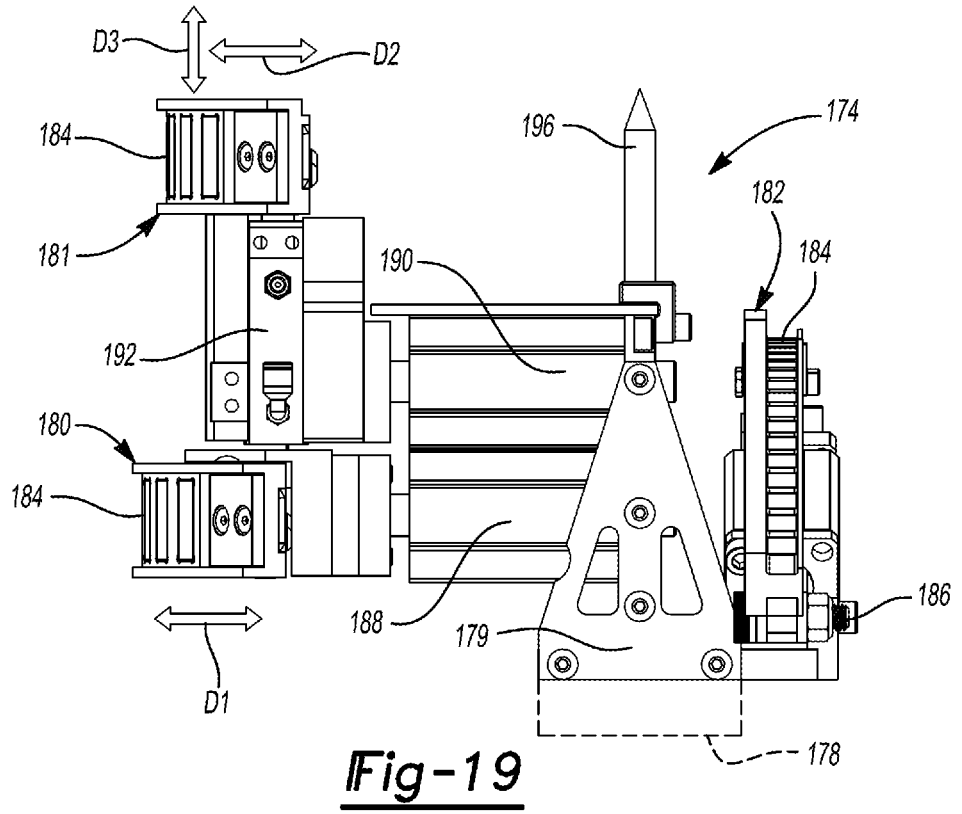
FIG. 19 is a side view of the weight-application tool.

The movement in direction D1 of the first flat-weight wet-out tool 180 can be actuated using a first actuator 188. The movements of the second flat-weight wet-out tool 181 can be actuated using second and third actuators 190, 192. The second actuator 190 moves the second flat-weight wet-out tool 181 in the direction D2. The third actuator 192 moves the second flat-weight wet-out tool 181 in the direction D3. The pivotal movement in direction D4 of the flange-weight wet-out tool 182 can be actuated using a fourth actuator 194 (FIG. 18). The actuators 188, 190, 192, 194 can be any suitable type of actuator including, for example, electric motors, pneumatic actuators or hydraulic actuators. Each of the actuators 188, 190, 192, 194 can be operated independently of each other. In this manner, any one or more of the wet-out tools 180, 181, 182 can be moved in one or more of the directions D1, D2, D3, D4 at any given time by selectively actuating a desired one of the actuators 188, 190, 192, 194 or a desired combination of the actuators 188, 190, 192, 194. In order to maintain accurate control of where the pieces of weight material 12 are positioned on the wheel 14, it may be desirable for the weight-application tool 174 to include a centering pin 196, with a point at its leading end, which can be used as a reference to help the control arm 172 to position the weight-application tool 174 in space.

The structure and function of the upper weight-application apparatus 28 can be similar or identical to that of the lower weight-application apparatus 26. That is, the upper weight-application apparatus 28 may include some or all of the features described above and/or shown in the drawings with respect to the lower weight-application apparatus 26. Therefore, similar or identical features might not be described again in detail.

As shown in FIGS. 1-3, the upper weight-application apparatus 28 may include a robotic upper control arm 198 and an upper weight-application tool (an end-of-arm tool) 200. The upper control arm 198 may be movably mounted to the upper frame assembly 36 above the conveyor assembly 18 and the wheel-crowder assembly 20. The structure and function of the upper control arm 198 may be similar or identical to that of the lower control arm 172, and therefore, will not be described again in detail. In some configurations, the structure and function of upper weight-application tool 200 may be similar or identical to that of the lower weight-application tool 174 described above.

Figure 20:
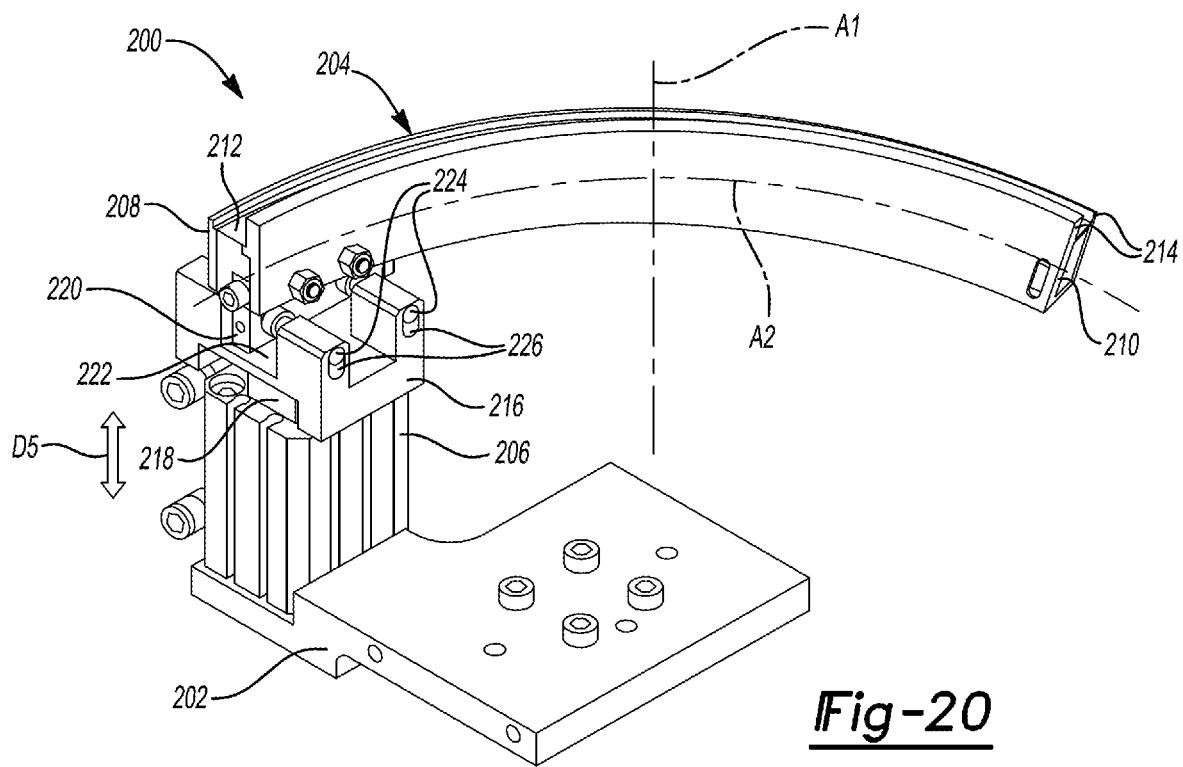
FIG. 20 is a perspective view of another weight-application tool of the apparatus.
Figure 21:
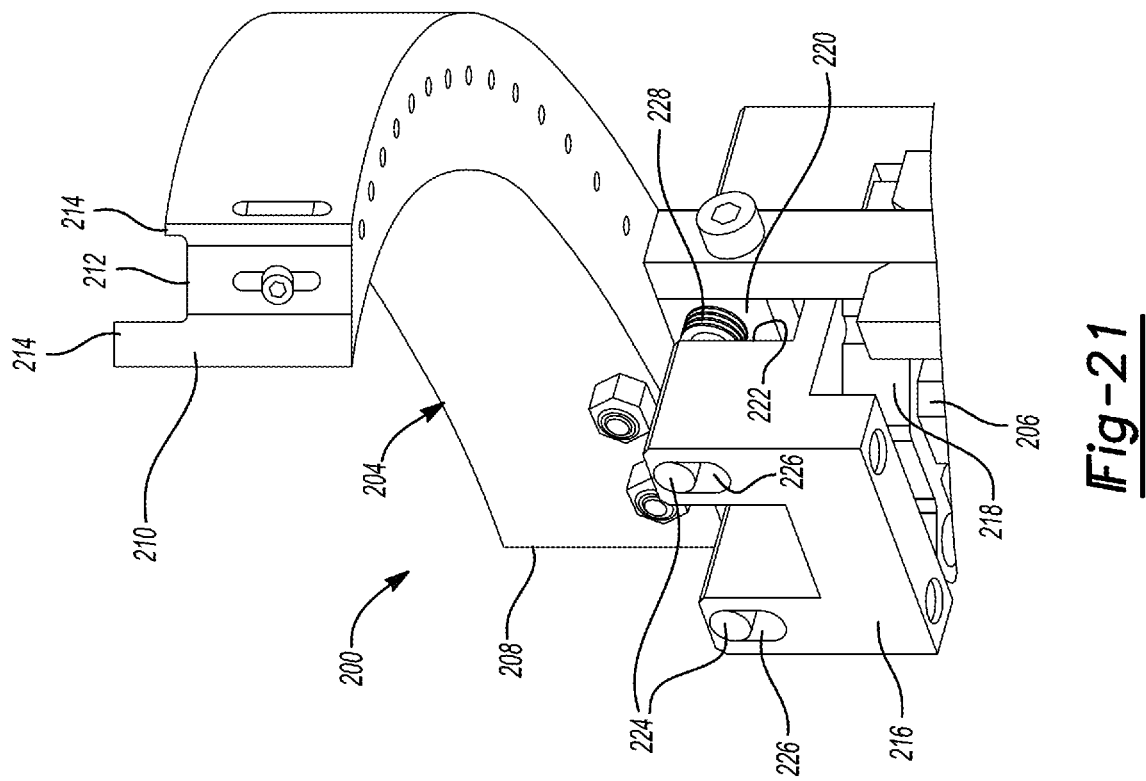
FIG. 21 is a partial perspective view of the weight application tool of FIG. 19.

FIGS. 20 and 21 depict a configuration of the upper weight-application tool 200 that includes a base 202, a single wet-out tool 204, and an actuator 206. The base 202 may be mounted to a distal end of the upper control arm 198. The actuator 206 may be mounted to the base 202 and drivingly connected to the wet-out tool 204. The actuator 206 can be selectively actuated to move the wet-out tool 204 in a direction D5. The actuator 206 can be any suitable type of actuator including, for example, an electric motor, a pneumatic actuator or a hydraulic actuator.

The wet-out tool 204 includes a first end 208, a second end 210, and an engagement surface 212 that extends between the first and second ends 208, 210. As described above with respect to the engagement surfaces 184 of the lower weight-application tool 174, the engagement surface 212 may engage a predetermined amount of weight material 12 dispensed from the upper severing-head assembly 24 via magnetic attraction, vacuum, a light snap-fit, and/or any other suitable means. In some configurations, lips 214 that extend along the length of the engagement surface 212 may prevent the weight material 12 from falling off of the engagement surface 212. That is, the lips 214 and the engagement surface 212 may define a channel in which the weight material 12 may be received.

The engagement surface 212 may be curved about a first axis A1 that may be parallel to the direction D5. The engagement surface 212 may also twist about a second axis A2 that is perpendicular to the first axis A1 and extends through the first and second ends 208, 210. The second axis A2 curves around the first axis A1 and may be a longitudinal centerline of the wet-out tool 204. The curved and twisted shape (i.e., helical shape) of the engagement surface 212 may facilitate application of the weight material 12 onto a variety of wheel-surface shapes (e.g., it facilitates wet-out of the adhesive 15 of the weight material 12 onto various surfaces of the wheel 14).

In some configurations, the upper weight-application tool 200 may also include a first mounting block 216 attached to a movable end 218 of the actuator 206 and a second mounting block 220 attached to the wet-out tool 204. The first mounting block 216 may include a recess 222 that movably receives the second mounting block 220. Pins 224 extending from the second mounting block 220 may be movably received in slots 226 in the first mounting block 216. Springs 228 (FIG. 21) disposed around the pins 224 may bias the second mounting block 220 (and thus, the wet-out tool 204) toward one side of the recess 222. This movement of the wet-out tool 204 and biasing force of the springs 228 may facilitate application of the weight material 12 onto a variety of wheel-surface shapes (e.g., it facilitates wet-out of the adhesive 15 of the weight material 12 onto various surfaces of the wheel 14). In some configurations, additional springs (not shown) may be disposed within the slots 226 and may bias the pins 224 upward toward an end of the slots 226 in a direction parallel to the direction D5.

With reference to FIGS. 1-22, operation of the apparatus 10 will be described. As described above, a wheel-balance machine (not shown) may spin the wheel 14 to determine which location(s) on the wheel 14 require additional weight to rotationally balance the wheel. The wheel-balance machine may communicate this information to a control module of the apparatus 10. Thereafter, the belts 46, 48 of the conveyor assembly 18 may move the wheel 14 into an initial position within the apparatus 10. Once the wheel 14 is in the initial position, the posts 98 of the wheel-crowder assembly 20 may be moved into contact with the outer circumferential surface of the wheel 14 and may precisely position the wheel 14 relative to the machine reference axis. With the wheel 14 held in place by the posts 98, the belts 46, 48 of the conveyor assembly 18 may be spread apart from each other (i.e., the belts 46, 48 may move away from each other in the direction perpendicular to the direction in which the belts 46, 48 move the wheel 14 into the initial position). Spreading the belts 46, 48 apart from each other allows more space for the weight-application apparatuses 26, 28 to access the locations on the wheel 14 at which the weight material 12 will be applied.

Based on the information from the wheel-balance machine, one or both of the severing-head assemblies 22, 24 may dispense one or more predetermined amounts of weight material 12 from respective spools 30 and remove the liner 13 from the weight material 12 to expose the adhesive 15. The wet-out tools 180, 181, 182, 204 of the weight-application apparatuses 26, 28 may engage corresponding pieces of weight material 12 dispensed from the severing-head assemblies 22, 24. Once the weight material 12 is attached its corresponding the wet-out tool 180, 181, 182, 204 the corresponding severing-head assembly 22, 24 may cut the predetermined amount of weight material 12 from the spool 30. Once the predetermined amount of weight material 12 is cut from the spool 30, the control arm(s) 172, 198 and one or more of the actuators 188, 190, 192, 194, 206 may move the wet-out tool(s) 180, 181, 182, 204 to the predetermined position(s) on the wheel 14 and apply the weight material 12 to the predetermined position(s). Once the one or more pieces of weight material 12 are applied to the corresponding locations on the wheel 14, the wheel-crowder assembly 20 may release the wheel 14 and the conveyor assembly 18 may move the wheel 14 out of the apparatus 10.

Figure 23:
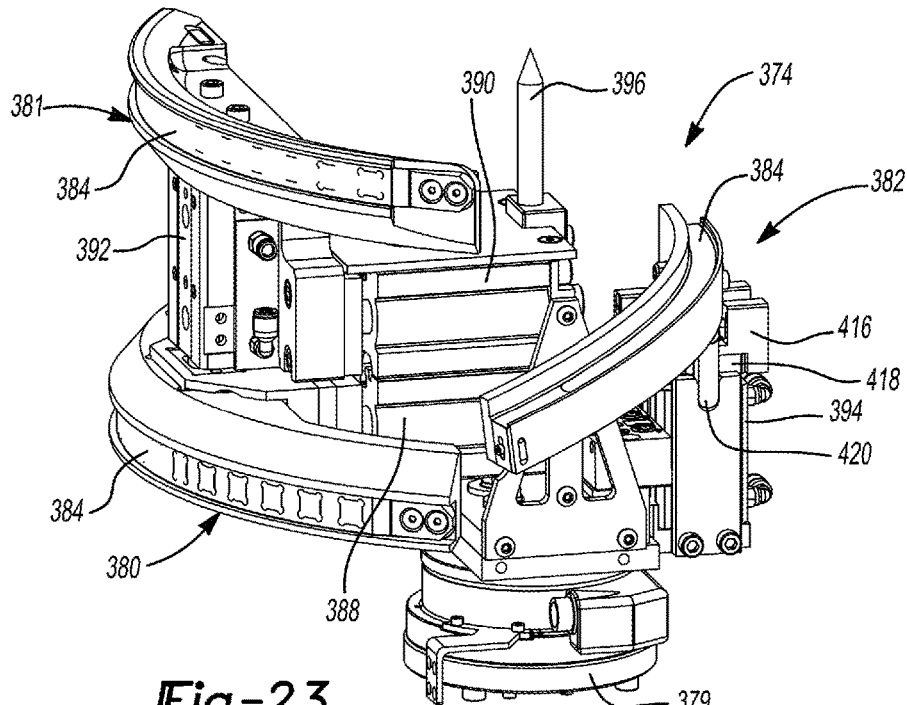
FIG. 23 is a perspective view of another weight-application tool according to the principles of the present disclosure.
Figure 24:
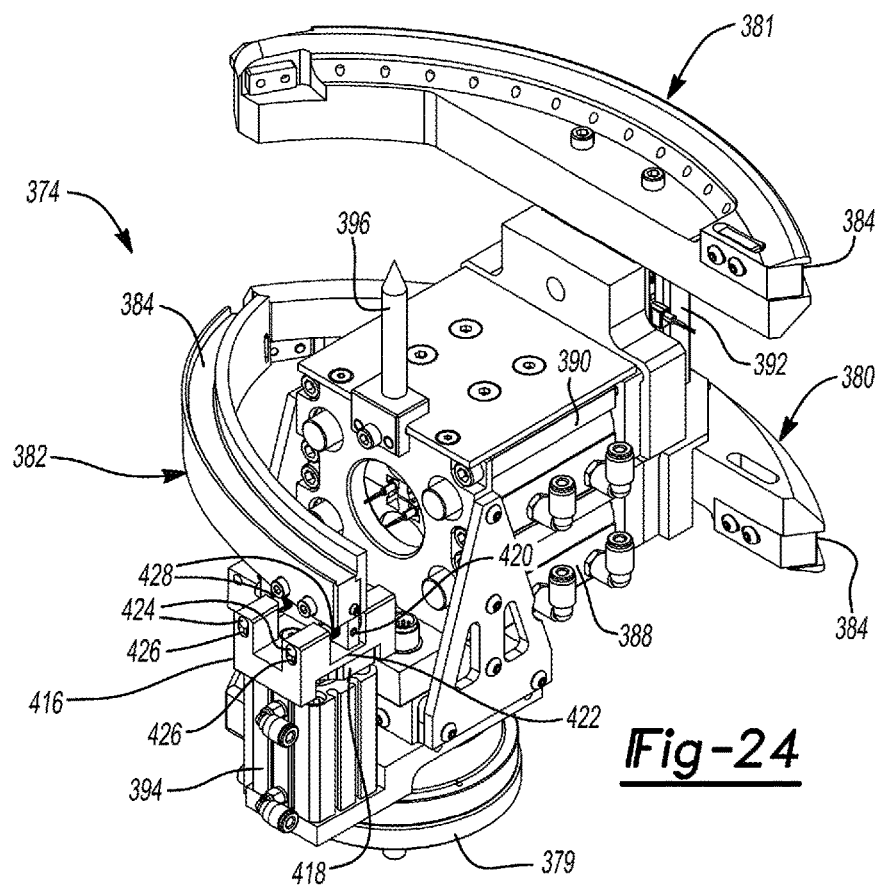
FIG. 24 is another perspective view of the weight-application tool of FIG. 22.
Figure 25:
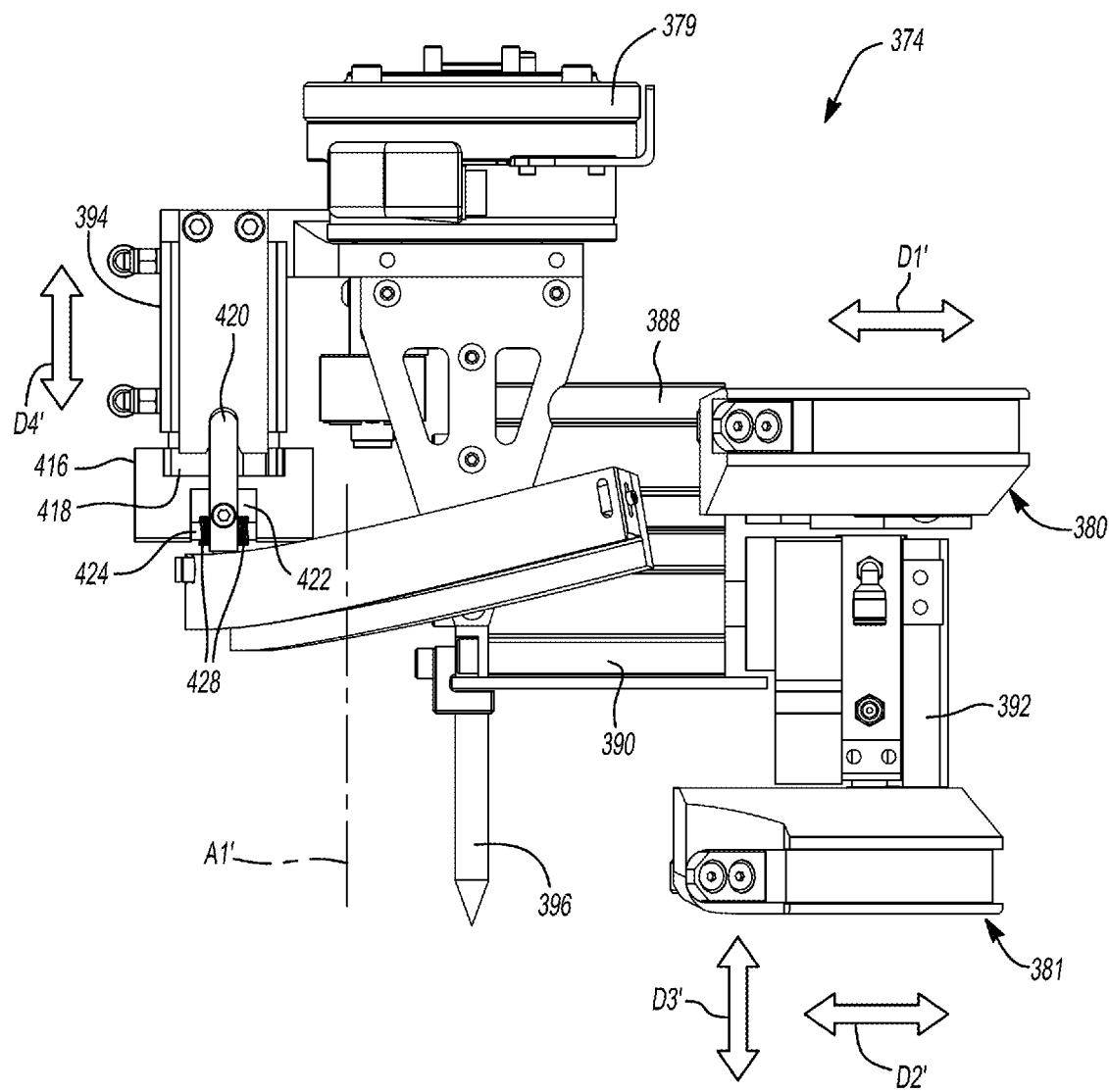
FIG. 25 is a side view of the weight-application tool of FIG. 22.

Referring now to FIGS. 23-25, another weight-application tool 374 is provided that can be incorporated into the weight-application apparatus 26 of the apparatus 10 in place of the weight-application tool 174. The structure and/or function of the weight-application tool 374 may be similar or identical to that of the weight-application tool 174 described above, apart from any exceptions described below and/or shown in the drawings. Like the weight-application tool 174, the weight-application tool 374 is capable of receiving one or more predetermined amounts of one or more weight material 12 (i.e., one piece of weight material 12 at a time or multiple pieces at one time) from the lower severing-head assembly 22 and applying the weight material 12 onto one or more predetermined locations on the wheel 14.

The weight-application tool 374 may include a base 379, one or more flat-weight wet-out tools (e.g., first and second flat-weight wet-out tools 380, 381) mounted to the base 379, and one or more flange-weight wet-out tools 382 mounted to the base 379. One of the articulating joints (e.g., a pivoting joint) 178 may connect the base 379 to the control arm 172, 198. The flat-weight wet-out tools 380, 381 can be used to apply one or more pieces of weight material 12 onto one or more flat surfaces (e.g., a flat surface 183 (FIG. 22) on the car side or curb side of a wheel rim 85) of the wheel 14 (see, e.g., the wet-out tools of U.S. Pat. No. 8,943,940). The flange-weight wet-out tool 382 can be used for applying a piece of weight material 12 onto a flange surface (e.g., the inside radius of curvature of a flange lip 185 (FIG. 22) of a wheel rim flange) of the wheel 14. The flange-weight wet-out tool 382 can be located adjacent or directly connected to the articulating joints 178 of the control arm 172. Each of the wet-out tools 380, 381, 382 can have a curve engagement surface 384 (i.e., a curved weight-receiving/applying face) on which a piece of weight material 12 is attached, before the weight material is applied to the wheel 14. The pieces of weight material 12 can be attached to the curved engagement surface 384 by magnetic attraction, vacuum, a light snap-fit, and/or any other suitable means.

Like the first flat-weight wet-out tool 180, the first flat-weight wet-out tool 380 may be moveable relative to the base 379 only in a direction D1' (FIG. 25) perpendicular to its arc-shaped engagement surface 384. Like the second flat-weight wet-out tool 181, the second flat-weight wet-out tools 381 may be moveable relative to the base 379 in a direction D2' (FIG. 25) perpendicular to its engagement surface 384 and in another direction D3' (FIG. 25) orthogonal thereto. Like the wet-out tool 204, the flange-weight wet-out tool 382 may be movable in a direction D4' (FIG. 24) parallel to the direction D3'.

The movement in direction D1' of the first flat-weight wet-out tool 380 can be actuated using a first actuator 388. The movements of the second flat-weight wet-out tool 381 can be actuated using second and third actuators 390, 392. The second actuator 390 moves the second flat-weight wet-out tool 381 in the direction D2'. The third actuator 392 moves the second flat-weight wet-out tool 381 in the direction D3'. The movement in direction D4' of the flange-weight wet-out tool 382 can be actuated using a fourth actuator 394 (FIGS. 24 and 25). The actuators 388, 390, 392, 394 can be any suitable type of actuator including, for example, electric motors, pneumatic actuators or hydraulic actuators. Each of the actuators 388, 390, 392, 394 can be operated independently of each other. In this manner, any one or more of the wet-out tools 380, 381, 382 can be moved in one or more of the directions D1', D2', D3', D4' at any given time by selectively actuating a desired one of the actuators 388, 390, 392, 394 or a desired combination of the actuators 388, 390, 392, 394. In order to maintain accurate control of where the pieces of weight material 12 are positioned on the wheel 14, it may be desirable for the weight-application tool 374 to include a centering pin 396, with a point at its leading end, which can be used as a reference to help the control arm 172 to position the weight-application tool 374 in space.

The engagement surface 384 of the flange-weight wet-out tool 382 may be generally helical. For example, the engagement surface 384 of the flange-weight wet-out tool 382 may be curved about a first linear axis A1' (FIG. 25) that may be parallel to the directions D3' and D4' and may be inclined at an angle (i.e., a non-zero and non-perpendicular angle) relative to the first linear axis A1' (i.e., the engagement surface 384 slopes in the direction D4' as the engagement surface 384 curves around the first linear axis A1'). Such a helical shape of the engagement surface 384 of the flange-weight wet-out tool 382 may facilitate application of the weight material 12 onto a variety of wheel-surface shapes (e.g., it facilitates wet-out of the adhesive 15 of the weight material 12 onto various surfaces of the wheel 14).

A first mounting block 416 may be attached to a movable end 418 of the fourth actuator 396 and a second mounting block 420 may be attached to the flange-weight wet-out tool 382. A shown in FIG. 24, the first mounting block 416 may include a recess 422 that movably receives the second mounting block 420. Pins 424 extending from the second mounting block 420 may be movably received in slots 426 in the first mounting block 416. Springs 428 (FIG. 24) disposed around the pins 424 may bias the second mounting block 420 (and thus, the flange-weight wet-out tool 382) toward the middle of the recess 422 (or, in some configurations, toward one side of the recess 422). This movement of the flange-weight wet-out tool 382 and biasing force of the springs 428 may facilitate application of the weight material 12 onto a variety of wheel-surface shapes (e.g., it facilitates wet-out of the adhesive 15 of the weight material 12 onto various surfaces of the wheel 14). In some configurations, additional springs (not shown) may be disposed within the slots 426 and may bias the pins 424 upward toward an end of the slots 426 in a direction parallel to the direction D4′.

Addition Embodiments

1. An apparatus for applying a weight to a wheel comprising:
at least one severing device capable of separating a piece of desired weight from each of at least two provided lengths of weight materials; and
at least one weight application device capable of applying a severed piece from each of at least two different weight materials to a different location on a wheel.

2. The apparatus of embodiment 1, further comprising a dispensing device capable of dispensing a provided length of two weight materials to said severing device, wherein each length of provided weight material can be severed into pieces of a desired weight.

3. The apparatus of embodiment 2, further comprising at least two lengths of different weight material, which can be severed into pieces of a desired weight.

4. The apparatus of embodiment 2, wherein said dispensing device comprises at least two spools, with each spool being capable of having one length of the weight material wound thereon, and the weight material can be pulled from its respective spool and dispensed to said severing device.

5. The apparatus of embodiment 4, wherein said spools are disposed one behind the other.

6. The apparatus of embodiment 5, wherein said dispensing device further comprises a guide roller for guiding the length of weight material pulled from each spool to said severing device.

7. The apparatus of embodiment 6, further comprising a drive motor for rotating each said guide roller so as to at least assist in the pulling of the weight material from the spools.

8. The apparatus of any one of embodiments 4 to 7, further comprising at least two lengths of different weight material, which can be severed into pieces of a desired weight, wherein each said length of weight material is wound around one of said spools.

9. The apparatus of any one of embodiments 1 to 8, wherein said at least one severing device is at least a first severing device and a second severing device, capable of severing a piece of the desired weight from each type of the provided weight material.

10. The apparatus of any one of embodiments 1 to 9, wherein each said severing device comprises at least two severing mechanisms, with each severing mechanism being capable of severing a piece from the corresponding length of weight material passing therethrough.

11. The apparatus of embodiment 10, wherein each of the severing mechanisms comprises a cutting head housing a cutting blade that is movable so as to sever a piece of the desired weight from each type of the provided weight material.

12. The apparatus of embodiment 11, wherein each said severing mechanism comprises a guide block with each guide block defining a channel with a cross sectional profile that allows the corresponding weight material to pass through the channel, be directed along a path, and beyond one corresponding cutting head.

13. The apparatus of embodiment 12, wherein the guide blocks each have a channel with a different cross sectional profile for allowing a different cross sectionally shaped weight material to pass therethrough.

14. The apparatus of any one of embodiments 1 to 13, further comprising one backing removal mechanism for use with each severing mechanism, when the weight material is adhesive backed and the adhesive is protected by a backing, where each said backing removal mechanism facilitates the removal of a corresponding length of backing from the weight material, before the corresponding piece of desired weight is severed.

15. The apparatus of any one of embodiments 11 to 14, wherein said severing device comprises a drive roller and each severing mechanism comprises at least one engaging rollers, with each engaging roller being independently movable toward and away from said drive roller so as to independently press one corresponding weight material against said drive roller and thereby enable said drive roller to move each weight material, either separately or simultaneously, a desired distance past its corresponding cutting head so as to control the weight of each piece formed.

16. The apparatus of any one of embodiments 10 to 15, wherein each severing mechanism further comprises at least one weight material lift arm capable of separating one corresponding weight material from contacting said drive roller, while said drive roller is rotating.

17. The apparatus of embodiment 16, wherein each weight material lift arm is connected to one engaging roller so that each weight material lift arm moves in unison with movement of its corresponding engaging roller.

18. The apparatus of any one of embodiments 10 to 13 and 15 to 17, wherein each severing mechanism further comprises a weight material clamp, with each clamp being capable of maintaining the position of its corresponding weight material within its corresponding severing mechanism.

19. The apparatus of embodiment 18, wherein each weight material clamp comprises a gripper top plate disposed so as to be movable so as to clamp its corresponding weight material in place.

20. The apparatus according to any one of embodiments 1 to 19, wherein said at least one weight application device is at least a first weight application device and a second weight application device.

21. The apparatus according to any one of embodiments 1 to 20, wherein each said weight application device comprises a tool mounted on the end of an implementation or control arm, with said tool being capable of receiving from one severing device, and applying onto a wheel, the piece of desired weight severed from each of at least two provided lengths of weight materials, and said control arm being capable of being actuated to (a) position said tool adjacent said one severing device so as to receive the piece of weight material and produce a loaded tool, (b) reposition said loaded tool adjacent different locations on the wheel, and (c) contact so as to bond each severed piece on said loaded tool to its own location on the wheel.

22. The apparatus according to embodiment 21, wherein said tool is capable of being loaded with multiple severed pieces of weight material received from said one severing device.

23. The apparatus according to embodiment 21 or 22, wherein at least one said weight application device comprises a pivot joint connecting its tool and control arm.

24. The apparatus according to any one of embodiments 21 to 23, wherein each said tool comprises at least one first wet out device for applying a piece of flat weight material onto a flat surface of the wheel and at least one second wet out device for applying a piece of flange weight material onto a flange surface of the wheel.

25. The apparatus according to embodiment 24, wherein at least one said tool further comprises at least one of said first wet out device or said second wet out device.

26. The apparatus according to embodiment 25, wherein only said second wet out device is located adjacent to said pivot joint.

27. The apparatus according to any one of embodiments 24 to 26, wherein each said wet out device has an arc shaped face on which a piece of weight material is to be located, before the piece is applied to the wheel.

28. The apparatus according to embodiment 27, wherein said tool comprises two spaced apart first wet out devices and one second wet out device, with one wet out device being moveable only in a direction perpendicular to its arc shaped face, the other first wet out device being moveable in a direction perpendicular to its face and in another direction orthogonal thereto, and said second wet out device being movable at one end so as to pivot about a pivot point located at its other end.

29. The apparatus according to any one of embodiments 1 to 28, wherein said weight application device is capable of adhesively bonding the piece of desired weight severed from each of at least two provided lengths of weight material at different locations on the wheel.

30. The apparatus according to embodiment 29, wherein said weight application device is capable of adhesively bonding the piece of desired weight severed from a provided length of flat weight material and a provided length of flange weight material at different locations on the wheel.

31. The apparatus according to any one of embodiments 1 to 30, wherein said apparatus is capable of processing continuous weight materials and segmented weight materials, or any combination thereof 32. The apparatus according to any one of embodiments 1 to 31, further comprising a wheel conveyor assembly capable of moving a wheel into position relative to said weight application device to enable each severed piece of weight material to by bonded to its own location on the wheel.

33. The apparatus according to embodiment 32, wherein said wheel conveyor assembly includes at least one first conveyor belt and at least one second conveyor belt that can be moved apart or together, so as to remain in sufficient proximity to each other to allow contact with the wheel so the wheel can be moved by said belts to a desired location relative to said severing devices and each weight application device.

34. The apparatus according to embodiment 20, further comprising a wheel conveyor assembly capable of moving a wheel into position relative to said weight application device to enable each severed piece of weight material to by bonded to its own location on the wheel, wherein said wheel conveyor assembly includes at least one first conveyor belt and at least one second conveyor belt that can be moved apart or together, so as to remain in sufficient proximity to each other to allow contact with the wheel so the wheel can be moved by said belts to a desired location relative to said severing devices and each weight application device, and said belts can be moved far enough apart to allow sufficient access to the wheel by said lower weight application device.

35. The apparatus according to any one of embodiments 32 to 34, wherein both said belts can be moved at the same time, in opposite directions and the same distance from a center line of a frame on which said belts are mounted.

36. The apparatus according to any one of embodiments 1 to 35, further comprising a wheel crowder device capable of securing against movement of the wheel during the application of each piece of weight material by said weight application device.

37. A method of applying a weight to a wheel using an apparatus according to any one of the embodiments 1 to 36.

38. An apparatus for applying a weight material onto a wheel, the apparatus comprising:

a severing-head assembly comprising a housing, a severing device, and a dispensing mechanism, wherein the dispensing mechanism positions a predetermined amount of the weight material relative to the severing device, and wherein the severing device is mounted for movement relative to the housing to separate the predetermined amount of the weight material from a source of the weight material;

an implementation or control arm including a first end mounted (e.g., movably mounted), and a second end having a weight-application tool configured, to transfer the predetermined amount of the weight material from the severing-head assembly to the wheel; and a conveyor assembly comprising a first conveyor actuator, a second conveyor actuator, a first continuous belt, a second continuous belt, a plurality of first rollers mounted on a first base member and supporting the first continuous belt for continuous-loop movement relative to the first base member, and a plurality of second rollers mounted on a second base member and supporting the second continuous belt for continuous-loop movement relative to the second base member, wherein the first conveyor actuator drives at least one of the first rollers and at least one of the second rollers, and wherein the second conveyor actuator drives the first base member relative to the second base member in a direction that is parallel to rotational axes of the first and second rollers to adjust a spacing between the first and second continuous belts.

39. The apparatus of Embodiment 38, wherein at least one of the first and second base members is slidably mounted on a plurality of rails.

40. The apparatus of Embodiment 38 or 39, wherein the conveyor assembly includes a shaft that is rotatable relative to the first and second base members and rotationally fixed relative to the at least one of the first rollers and the at least one of the second rollers.

41. The apparatus of Embodiment 40, wherein the at least one of the second rollers is slidable along an axial length of the shaft.

42. The apparatus of Embodiment 41, wherein the conveyor assembly is mounted on a frame and includes a linkage movably coupling the first and second base members to each other; and the shaft is disposed at a first side of the frame, and the linkage is disposed at a second side of the frame opposite the first side.

43. The apparatus of Embodiment 42, wherein the linkage includes a first link, a second link pivotably attached to a first end of the first link and pivotably attached to the first base member, and a third link pivotably attached to a second end of the first link and pivotably attached to the second base member; and an intermediate portion of the first link is pivotably attached relative to the frame.

44. The apparatus of any one of Embodiments 38 to 43, wherein the first conveyor actuator is attached to one of the first and second base members, and movable with the one of the first and second base members relative to the other of the first and second base members in response to actuation of the second conveyor actuator.

45. The apparatus of any one of Embodiments 38 to 44, wherein the dispensing mechanism includes a dispensing actuator, a drive roller, an engagement actuator, and a freely-rotating engagement roller, the dispensing actuator rotatably drives the drive roller about a rotational axis of the drive roller, the drive roller contacts a first side of the weight material the freely-rotating engagement roller contacts a second opposite side of the weight material, and the engagement actuator translates the freely-rotating engagement roller in a direction perpendicular to the rotational axis of the drive roller.

46. The apparatus of Embodiment 45, wherein the dispensing mechanism includes another severing device, a pair of severing-device actuators, another engagement actuator, and another freely-rotating engagement roller, the severing-device actuators are operable independently of each other to move the severing devices independently of each other, and the engagement actuators are operable independently of each other to translate the freely-rotating engagement rollers independently of each other to selectively and independently cause movement of two different sources (e.g., spools) of weight material.

47. The apparatus of any one of Embodiments 38 to 46, wherein the severing-head assembly includes a pair of severing devices, the housing includes first and second lanes receiving first and second predetermined amounts of weight material, respectively, one of the severing devices separating the first predetermined amount of weight material from a first source of weight material, another one of the severing devices separating the second predetermined amount of weight material from a second source of weight material, and the dispensing mechanism driving the first and second predetermined amounts of weight material through the first and second lanes.

48. The apparatus of any one of Embodiments 38 to 47, wherein the severing-head assembly includes a liner-guide pin and a plurality of tensioning rollers, the liner-guide pin is disposed between the severing device and the dispensing mechanism and defines a passageway through which the predetermined amount of the weight material passes while a liner of the weight material wraps around the liner-guide pin and separates from the weight material, the tensioning rollers engage the removed liner, and two of the tensioning rollers are translationally fixed relative to the housing, and one of the tensioning rollers is translatable relative to the housing and is spring biased into engagement with the removed liner.

49. The apparatus of any one of Embodiments 38 to 48, wherein the severing-head assembly includes a cantilevered weight-material guide that is fixed relative to the housing, the weight-material guide includes a first end, a second end and a curved guide surface extending between the first and second ends, the first end disposed proximate a weight-material-outlet of the housing through which the predetermined amount of the weight material passes below the severing device, and the guide surface extends away from the housing to the second end of the weight-material guide.

50. The apparatus of Embodiment 49, wherein the weight-application tool includes a curved engagement surface that engages the weight material and faces the guide surface of the weight-material guide during a transfer of the weight material to the weight-application tool.

51. The apparatus of Embodiment 50, wherein the engagement surface has a curvature that matches a curvature of the guide surface.

52. The apparatus of any one of Embodiments 38 to 51, wherein the weight-application tool includes an engagement surface that engages the weight material, the engagement surface having shape that is curved about a first axis and twisted about a second axis that is perpendicular to the first axis.

53. The apparatus of any one of Embodiments 38 to 52, wherein the weight-application tool includes an engagement surface that engages the weight material, the engagement surface having helical shape.

54. An apparatus for applying weight material onto a wheel, the apparatus comprising:
a severing-head assembly comprising a housing, a dispensing mechanism, a first severing device, and a second severing device, wherein the housing includes first and second lanes receiving first and second predetermined amounts of weight material, respectively, wherein the first severing device separates the first predetermined amount of weight material from a first source of weight material, wherein the second severing device separates the second predetermined amount of weight material from a second source of weight material, and wherein the dispensing mechanism drives the first and second predetermined amounts of weight material through the first and second lanes; and
an implementation or control arm movably mounted and having a weight-application tool for transferring the first and second predetermined amounts of weight material from the severing-head assembly to first and second locations on a wheel.

55. The apparatus of Embodiment 54, wherein the weight material of the first source includes a first cross-sectional shape, and the weight material of the second source includes a second cross-sectional shape.

56. The apparatus of Embodiment 54 or 55, wherein the weight material of the first source is a different material that the weight material of the second spool.

57. The apparatus of any one of Embodiments 54 to 56, wherein the weight-application tool includes a first engagement surface and a second engagement surface that simultaneously engage the first and second predetermined amounts of weight material, respectively.

58. The apparatus of Embodiment 57, wherein the first and second engagement surfaces have a common axis or parallel axes of curvature.

59. The apparatus of Embodiment 57, wherein the first and second engagement surfaces have first and second axes of curvature, respectively, that are perpendicular to each other.

60. The apparatus of Embodiment 54, further comprising:
a conveyor assembly comprising a first conveyor actuator, a second conveyor actuator, a first continuous belt, a second continuous belt, a plurality of first rollers mounted on a first base member and supporting the first continuous belt for continuous-loop movement relative to the first base member, and a plurality of second rollers mounted on a second base member and supporting the second continuous belt for continuous-loop movement relative to the second base member,
wherein the first conveyor actuator drives at least one of the first rollers and at least one of the second rollers, and the second conveyor actuator driving the first base member relative to the second base member in a direction that is parallel to rotational axes of the first and second rollers to adjust a spacing between the first and second continuous belts.

61. The apparatus of Embodiment 60, wherein at least one of the first and second base members is slidably mounted on a plurality of rails.

62. The apparatus of Embodiment 60, wherein the first conveyor actuator is attached to one of the first and second base members and is movable with the one of the first and second base members relative to the other of the first and second base members in response to actuation of the second conveyor actuator.

63. The apparatus of Embodiment 60, wherein the conveyor assembly includes a shaft that is rotatable relative to the first and second base members and rotationally fixed relative to the at least one of the first rollers and the at least one of the second rollers.

64. The apparatus of Embodiment 63, wherein the at least one of the second rollers is slidable along an axial length of the shaft.

65. The apparatus of Embodiment 64, wherein the conveyor assembly is mounted on a frame and includes a linkage movably coupling the first and second base members to each other, wherein the shaft is disposed at a first side of the frame, and the linkage is disposed at a second side of the frame opposite the first side.

66. The apparatus of Embodiment 65, wherein the linkage includes a first link, a second link pivotably attached to a first end of the first link and pivotably attached to the first base member, and a third link pivotably attached to a second end of the first link and pivotably attached to the second base member, and wherein an intermediate portion of the first link is pivotably attached relative to the frame.

67. The apparatus of any one of Embodiments 54 to 66, wherein the dispensing mechanism includes a dispensing actuator, a drive roller, first and second engagement actuators, and first and second freely-rotating engagement rollers, the dispensing actuator rotatably drives the drive roller about a rotational axis of the drive roller, the drive roller contacts a first side of weight material from the first and second sources (e.g., spools), the first freely-rotating engagement roller contacts a second opposite side of the weight material from the first source, the second freely-rotating engagement roller contacts a second opposite side of the weight material from the second source, the first engagement actuator translates the first freely-rotating engagement roller in a direction perpendicular to the rotational axis of the drive roller, and the second engagement actuator translates the second freely-rotating engagement roller in the direction perpendicular to the rotational axis of the drive roller.

68. The apparatus of Embodiment 67, wherein the first freely-rotating engagement roller is attached to and translatable with a first lift arm that includes flanges that lift a first length of weight material off of the drive roller when the first freely-rotating engagement roller and the first lift arm are translated away from the drive roller, and wherein the second freely-rotating engagement roller is attached to and translatable with a second lift arm that includes flanges that lift a second length of weight material off of the drive roller when the second freely-rotating engagement roller and the second lift arm are translated away from the drive roller.

69. The apparatus of any one of Embodiments 54 to 68, wherein the severing-head assembly includes a liner-guide pin and a plurality of tensioning rollers, the liner-guide pin is disposed between the severing device and the dispensing mechanism and defines a passageway through which the predetermined amount of the weight material passes while a liner of the weight material wraps around the liner-guide pin and separates from the weight material, the tensioning rollers engage the removed liner, and two of the tensioning rollers are translationally fixed relative to the housing, and one of the tensioning rollers is translatable relative to the housing and is spring biased into engagement with the removed liner.

70. The apparatus of any one of Embodiments 54 to 69, wherein the severing-head assembly includes a cantilevered weight-material guide that is fixed relative to the housing, the weight-material guide includes a first end, a second end, and a curved guide surface extending between the first and second ends, the first end disposed proximate a weight-material-outlet of the housing through which the predetermined amount of the weight material passes below the severing device, and the guide surface extending away from the housing to the second end of the weight-material guide.

71. The apparatus of Embodiment 70, wherein the weight-application tool includes a curved engagement surface that engages the weight material and faces the guide surface of the weight-material guide during a transfer of the weight material to the weight-application tool.

72. The apparatus of Embodiment 71, wherein the engagement surface has a curvature that matches a curvature of the guide surface.

73. An apparatus for applying weight material onto a wheel, the apparatus comprising:

a conveyor assembly;

an upper severing-head assembly mounted above the conveyor assembly and including a first housing, a first severing device, and a first dispensing mechanism, wherein the first dispensing mechanism positions a first predetermined amount of weight material from a first source (e.g., spool) relative to the first severing device, and wherein the first severing device is mounted for movement relative to the first housing to separate the first predetermined amount of weight material from the first source;

an upper control arm including a first end movably mounted above the conveyor assembly and a second end having a first weight-application tool configured to transfer the first predetermined amount of weight material from the upper severing-head assembly to a first location on the wheel;

a lower severing-head assembly mounted below the conveyor assembly and including a second housing, a second severing device, a third severing device and a second dispensing mechanism, wherein the second housing includes first and second lanes receiving second and third predetermined amounts of weight material from second and third sources (e.g., spools), respectively, wherein the second dispensing mechanism drives the second and third predetermined amounts of weight material through the first and second lanes, wherein the second severing device is mounted for movement relative to the second housing to separate the second predetermined amount of weight material from the second spool, and wherein the third severing device is mounted for movement relative to the second housing to separate the third predetermined amount of weight material from the third source; and a lower control arm including a first end movably mounted below the conveyor assembly and a second end having second and third weight-application tools configured to transfer the second and third predetermined amounts of weight material from the lower severing-head assembly to second and third locations on the wheel.

74. The apparatus of Embodiment 73, wherein the conveyor assembly includes a first conveyor actuator, a second conveyor actuator, a first continuous belt, a second continuous belt, a plurality of first rollers mounted on a first base member and supporting the first continuous belt for continuous-loop movement relative to the first base member, and a plurality of second rollers mounted on a second base member and supporting the second continuous belt for continuous-loop movement relative to the second base member, the first conveyor actuator drives at least one of the first rollers and at least one of the second rollers, and the second conveyor actuator drives the first base member relative to the second base member in a direction that is parallel to rotational axes of the first and second rollers to adjust a spacing between the first and second continuous belts.

75. The apparatus of Embodiment 74, wherein at least one of the first and second base members is slidably mounted on a plurality of rails.

76. The apparatus of Embodiment 74, wherein the first conveyor actuator is attached to one of the first and second base members and is movable with the one of the first and second base members relative to the other of the first and second base members in response to actuation of the second conveyor actuator.

77. The apparatus of Embodiment 74, wherein the conveyor assembly includes a shaft that is rotatable relative to the first and second base members and rotationally fixed relative to the at least one of the first rollers and the at least one of the second rollers.

78. The apparatus of Embodiment 77, wherein the at least one of the second rollers is slidable along an axial length of the shaft.

79. The apparatus of Embodiment 78, wherein the conveyor assembly is mounted on a frame and includes a linkage movably coupling the first and second base members to each other, wherein the shaft is disposed at a first side of the frame, and the linkage is disposed at a second side of the frame opposite the first side.

80. The apparatus of Embodiment 79, wherein the linkage includes a first link, a second link pivotably attached to a first end of the first link and pivotably attached to the first base member, and a third link pivotably attached to a second end of the first link and pivotably attached to the second base member, and wherein an intermediate portion of the first link is pivotably attached relative to the frame.

81. The apparatus of any one of Embodiments 73 to 80, wherein the second dispensing mechanism includes a dispensing actuator, a drive roller, first and second engagement actuators, and first and second freely-rotating engagement rollers, the dispensing actuator rotatably drives the drive roller about a rotational axis of the drive roller, the drive roller contacts a first side of weight material from the first and second sources, the first freely-rotating engagement roller contacts a second opposite side of the weight material from the second source, the second freely-rotating engagement roller contacts a second opposite side of the weight material from the third source, the first engagement actuator translates the first freely-rotating engagement roller in a direction perpendicular to the rotational axis of the drive roller, and the second engagement actuator translates the second freely-rotating engagement roller in the direction perpendicular to the rotational axis of the drive roller.

82. The apparatus of any one of Embodiments 73 to 81, wherein each of the upper and lower severing-head assemblies includes a liner-guide pin and a plurality of tensioning rollers, the liner-guide pin is disposed between the severing device and the dispensing mechanism and defines a passageway through which the predetermined amount of the weight material passes while a liner of the weight material wraps around the liner-guide pin and separates from the weight material, the tensioning rollers engage the removed liner, wherein two of the tensioning rollers are translationally fixed relative to the housing, and one of the tensioning rollers is spring biased into engagement with the removed liner.

83. The apparatus of any one of Embodiments 73 to 82, wherein at least one of the upper and lower severing-head assemblies includes a cantilevered weight-material guide that includes a first end, a second end and a curved guide surface extending between the first and second ends.

84. The apparatus of Embodiment 83, wherein one of the first, second and third weight-application tools includes a curved engagement surface that engages weight material and faces the guide surface of the weight-material guide during a transfer of the weight material to the weight-application tool.

85. The apparatus of Embodiment 84, wherein the engagement surface has a curvature that matches a curvature of the guide surface.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus for applying a weight to a wheel comprising:
   at least one severing device capable of separating a piece of desired weight from each of at least two provided different lengths of weight materials;
   a single drive roller for separately driving the at least two provided lengths of weight materials along at least two corresponding paths so each length of weight material can be dispensed separately or at the same time;
   at least one weight application device capable of applying a severed piece of weight material, from at least one or each of the at least two provided different lengths of weight materials, to different locations on a wheel, and
   an engagement roller for each provided length of weight material, with each engagement roller being movable toward and away from the single drive roller such that, when a corresponding length of weight material is disposed between the engagement roller and the single drive roller, each engagement roller can be moved, independent of any other engagement roller, either (a) toward the single drive roller to press the corresponding length of weight material into contact with the single drive roller or (b) away from the single drive roller so the corresponding length of weight material can be moved away from contact with the single drive roller.

2. The apparatus of claim 1, further comprising a lift structure for lifting each length of weight material away from contacting the single drive roller, when its corresponding engagement roller has been moved away from the single drive roller a distance sufficient to permit such lifting.

3. The apparatus of claim 1, further comprising at least two lengths of different weight material, which can be severed into pieces of a desired weight, with at least one of the two lengths of different weight material being a flange weight material for being adhered to a flange surface of the wheel, the flange weight material having a cross-sectional notch that runs along its length.

4. The apparatus of claim 3, further comprising at least one wet out device, for applying a piece of the flange weight material onto the flange surface of the wheel, comprising an engagement surface for engaging the piece of flange weight material, and a lip that matches the notch of the piece of flange weight material so as to prevent the piece of flange weight material from falling off of the engagement surface.

5. The apparatus of claim 4, wherein the lip is disposed along one side of the engagement surface, and the at least one wet out device, for applying a piece of the flange weight material, further comprises an opposite lip disposed along an opposite side of the engagement surface so that these two lips and the engagement surface define a channel in which the piece of the flange weight material is received.

6. The apparatus of claim 4, wherein said severing device comprises said drive roller and each severing mechanism comprises at least one engaging rollers, with each engaging roller being independently movable toward and away from said drive roller so as to independently press one corresponding weight material against said drive roller and thereby enable said drive roller to move each weight material, either separately or simultaneously, a desired distance past its corresponding cutting head so as to control the weight of each piece formed.

7. The apparatus of claim 6, wherein each severing mechanism further comprises at least one weight material lift arm capable of separating one corresponding weight material from contacting said drive roller, while said drive roller is rotating.

8. The apparatus of claim 7, wherein each weight material lift arm is connected to one engaging roller so that each weight material lift arm moves in unison with movement of its corresponding engaging roller.

9. The apparatus of claim 1, wherein the at least one weight application device comprises:
   a mounting block, and
   at least one wet out device for engaging the severed piece of weight material during its application to a location on the wheel, with the wet out device being movable relative to the mounting block, under a biasing force, so as facilitate application of the severed piece of weight material onto various surfaces of the wheel,
   wherein the wet out device is movable vertically, laterally or both vertically and laterally, relative to the mounting block.

10. The apparatus of claim 1, wherein said at least one severing device is at least a first severing device and a second severing device, capable of severing a piece of the desired weight from each type of the provided weight material, and each said severing device comprises at least two severing mechanisms, with each severing mechanism being capable of severing a piece from the corresponding length of weight material passing therethrough.

11. The apparatus of claim 10, wherein each of the severing mechanisms comprises a cutting head housing a cutting blade that is movable so as to sever a piece of the desired weight from each type of the provided weight material, each said severing mechanism comprises a guide block with each guide block defining a channel with a cross sectional profile that allows the corresponding weight material to pass through the channel, be directed along a path, and beyond one corresponding cutting head, and the guide blocks each have a channel with a different cross sectional profile for allowing a different cross sectionally shaped weight material to pass therethrough.

12. The apparatus of claim 1, further comprising one backing removal mechanism for use with each severing mechanism, when the weight material is adhesive backed and the adhesive is protected by a backing, where each said backing removal mechanism facilitates the removal of a corresponding length of backing from the weight material, before the corresponding piece of desired weight is severed.

13. The apparatus of claim 1, wherein each said weight application device comprises a tool mounted on the end of an implementation arm, with said tool being capable of receiving from one severing device, and applying onto a wheel, the piece of desired weight severed from each of at least two provided lengths of weight materials, and said control arm being capable of being actuated to (a) position said tool adjacent said one severing device so as to receive the piece of weight material and produce a loaded tool, (b) reposition said loaded tool adjacent different locations on the wheel, and (c) contact so as to bond each severed piece on said loaded tool to its own location on the wheel.

14. The apparatus according to claim 13, wherein said tool is capable of being loaded with multiple severed pieces of weight material received from said one severing device.

15. The apparatus according to claim 13, wherein each said tool comprises at least one first wet out device for applying a piece of flat weight material onto a flat surface of the wheel, and at least one second wet out device for applying a piece of flange weight material onto a flange surface of the wheel.

16. The apparatus of claim 1, wherein said weight application device is capable of adhesively bonding the piece of desired weight severed from each of at least two provided lengths of weight material at different locations on the wheel.

17. The apparatus of claim 16, wherein said weight application device is capable of adhesively bonding the piece of desired weight severed from a provided length of flat weight material and a provided length of flange weight material at different locations on the wheel.

18. The apparatus of claim 1, wherein said apparatus is capable of processing continuous weight materials and segmented weight materials, or any combination thereof.

* * * * *